(12) United States Patent
Nishimura et al.

(10) Patent No.: US 6,545,885 B2
(45) Date of Patent: Apr. 8, 2003

(54) ISOLATED OPERATION PREVENTION DEVICE FOR DISTRIBUTED POWER SUPPLY AND INTERHARMONIC DETECTION METHOD

(75) Inventors: Shoji Nishimura, Kyoto (JP); Yoshifumi Minowa, Kyoto (JP); Masakuni Asano, Kyoto (JP); Noriaki Tokuda, Kyoto (JP); Tokuo Emura, Kyoto (JP); Yoshihiro Hada, Kyoto (JP)

(73) Assignee: Nissin Electric Co., Ltd., Kyoto (JP)

( * ) Notice: Subject to any disclaimer, the term of this patent is extended or adjusted under 35 U.S.C. 154(b) by 0 days.

(21) Appl. No.: 09/803,945

(22) Filed: Mar. 13, 2001

(65) Prior Publication Data

US 2002/0039299 A1 Apr. 4, 2002

(30) Foreign Application Priority Data

Mar. 13, 2000 (JP) .................................. P2000-068989
Jul. 27, 2000 (JP) .................................. P2000-226365

(51) Int. Cl.$^7$ .................................................. H02J 1/02
(52) U.S. Cl. .......................................... 363/39; 363/40
(58) Field of Search .............................. 363/39, 40, 50, 363/51, 55, 56.01, 56.1, 56.11, 56.12

(56) References Cited

U.S. PATENT DOCUMENTS 6,114,859 A * 9/2000 Koda et al. .................. 324/619
6,208,945 B1 * 3/2001 Koda et al. .................. 702/60

FOREIGN PATENT DOCUMENTS

JP 09-252540 9/1997
JP 10-248168 9/1998
JP 11-127542 5/1999
JP 11-252806 9/1999

OTHER PUBLICATIONS

Office Action dated Aug. 20, 2002, from the Japanese Patent Office issued in a counterpart foreign application and English translation thereof.

Motohashi, J., et al., *Performance of Islanding Protection Equipment for Dispersed Synchronous Generator* The Institute of Electrical Engineers of Japan, PE–98–102–117 and PSE–98–107, pp. 93–98 (Oct. 1998) and a partial English translation thereof.

Office Action dated Jul. 16, 2002, from the Japanese Patent Office issued in counterpart foreign application and English translation thereof.

* cited by examiner

*Primary Examiner*—Matthew Nguyen
(74) *Attorney, Agent, or Firm*—Finnegan, Henderson, Farabow, Garrett, & Dunner LLP

(57) ABSTRACT

A power fluctuation monitoring unit which monitors and detects the power fluctuation at a receiving point 9 by means of the measurement results of the voltage at injection point 14 of an intermediate-order harmonic current and the current at incoming line 10, a power compensation unit which forms the compensation power injection signal for canceling out the power fluctuation based on the detection results of the power fluctuation, and an inverter device 18 which is driven and controlled by the signal resulting from the addition of the intermediate-order harmonic current injection signal and the compensation power injection signal and injects the intermediate-order harmonic current and the compensation power into the injection point, are equipped.

8 Claims, 6 Drawing Sheets

ISOLATED OPERATION PREVENTION DEVICE FOR DISTRIBUTED POWER SUPPLY AND INTERHARMONIC DETECTION METHOD

BACKGROUND OF THE INVENTION

1. Field of the Invention

This invention relates to an isolated operation prevention device for a distributed power supply in a power system, which monitors and detects, at the customer equipment side, the interruption of the system supply due the opening of a circuit breaker at a substation and disconnects the distributed power supply from the system when the system supply is stopped to prevent isolated operation of the distributed power supply, and, to be more detailed, concerns the compensation of power fluctuations when a wind power generator, etc. is used as the distributed power supply.

2. Description of the Related Art

Conventionally, with customer equipment in factories, large-scale buildings, etc., so-called distributed power supplies have been interconnected with the power system, and shortages of the power generated by the distributed power supplies have been compensated by the system power.

In such cases, when a circuit breaker at a substation of a power company is opened due to a system fault, etc. and the system supply is stopped, the distributed power supply must be disconnected from the system and prevented from performing isolated operation in order to prevent the occurrence of electric shock accidents, etc. due to isolated operation of the distributed power supply.

As means for preventing this isolated operation without fail, the present applicant has invented, as disclosed in Japanese Patent Unexamined Publication No. Hei 10-248168 and Japanese Patent Unexamined Publication No. Hei 11-252806, isolated operation prevention devices for distributed power supply that inject an intermediate-order harmonic current, which is synchronized with the fundamental and has a frequency that is a non-integer multiple of the fundamental, into the system and disconnect the distributed power supply upon detecting the stoppage of the system supply from a change of the impedance or admittance for the injected frequency at the upstream side of the system.

Japanese Patent Unexamined Publication No. Hei 10-248168 discloses the detection of the stoppage of the system supply from a change of the amount (magnitude) of impedance or admittance itself, and Japanese Patent Unexamined Publication No. Hei 11-252806 discloses the detection of stoppage of the system supply based on a change of impedance or admittance that is equal to or a greater than a fixed value in the capacitive direction.

The above-described isolated operation prevention devices for distributed power supply are equipped only with the function of disconnecting the distributed power supply upon detection of the stoppage of the system supply.

Meanwhile, with the above-described type of customer equipment, when the voltage generated by the distributed power supply fluctuates during interconnected operation, the system voltage fluctuates due to the active and reactive power fluctuations of the distributed power supply, and especially in the case where the distributed power supply is comprised of a wind power generator, etc. with a large capacity, the flicker fluctuation (ripple fluctuation), due for example to the moment-to-moment wind power fluctuation that is overlapped onto the gradual voltage variation due to average variations of the wind power, is large and the fluctuation of the system voltage due to this fluctuation becomes a problem.

Priorly in order to restrict this fluctuation of the system voltage, a separate power compensation device was equipped in addition to the isolated operation prevention device for distributed power supply.

This power compensation device is formed, for example, in the same manner as a thyristor controlled reactor (TCR) system or an inverter (self-excited) type static VAR compensator (SVC) such as described in pp. 28–31 of the Nisshin Electric Technical Report Vol. 41, No. 3 ('96, 11) and compensates for the voltage fluctuation by phase control by the switching of a reactor or condenser or by the injection of an active or reactive compensation power by drive control of an inverter device.

Thus especially in the case of a receiving equipment equipped with a distributed power supply comprised of a wind power generator, etc., which has a large capacity and with which the generated power fluctuates, there is a need to equip a power compensation device in addition to the isolated operation prevention device for distributed power supply, thus making it necessary to make the customer equipment large in scale and requiring vast equipment investments on the part of the customer.

Examples of conventional distributed power supplies for customers, etc., which are put to interconnected operation with a system and with which a power converter, such as an inverter, etc., is connected to the system, include micro gas turbine generation systems, wind power generation systems, solar power generation systems, fuel cell systems, emergency power supply systems that use a generator, flywheel, etc., UPS, and constant-use power supply systems (cogeneration equipment).

When the system is normal, these distributed power supplies generate interconnected operation power that is synchronized with the system fundamental by means of an inverter or other power converter (power inverter) and supplies this power to the system.

When the circuit breaker of a substation is opened and the system supply is stopped, the isolated operation of the distributed power supply is detected and the distributed power supply is disconnected from the systems to prevent the occurrence of electric shock accidents, etc. due to isolated operation.

As a related art of the abovementioned isolated operation detection system, active systems described for example in pp. 24 to 25 of the literature, "Description of Technical Requirement Guidelines for Power System Interconnection '98" (3rd. edition, Denryoku Shinposha Co., Ltd., Sep. 24, 1998) are known.

Active systems can be classified largely into reactive power fluctuation systems ($\Delta Q$ systems) and active power fluctuation systems ($\Delta P$ systems).

(i) Reactive power fluctuation system ($\Delta Q$ system)

With this system, a periodic reactive power fluctuation is added to the generated output and the periodic voltage fluctuation or current fluctuation, etc. that appears upon transition to isolated operation is detected.

(ii) Active power fluctuation system ($\Delta P$ system)

With this system, a periodic active power fluctuation is added to the generated output and the periodic frequency fluctuation or voltage fluctuation, etc. that appears upon transition to isolated operation is detected.

As is clear for example from FIG. 5(a) of p.25 of the above-mentioned literature, in the case of a distributed power supply, with which isolated operation is detected by a conventional active detection system, since a reactive power fluctuation or an active power fluctuation is caused by adding modulation to the system fundamental output of the power converter and the isolated operation that accompanies the stoppage of the system supply is detected from the fluctuation of the fluctuation detection signal (active signal), it has the problem of imposing ill effects, such as flicker (reactive power fluctuation) or beating (active power fluctuation), on the system.

Also as is described in the "(1) Disconnection Time Interval" section in p. 152 of the above-mentioned literature, due to the fluctuation characteristics of the above-mentioned active signal, the conventional art requires approximately 3 to 10 seconds for detection of isolated operation. Time is thus required from the stoppage of the system supply to disconnection, and for example in the case where the reclosing time of a system that is one level above the system to which the distributed power supply is connected is extremely short and is less than 3 seconds, the disconnection cannot be performed in time to accommodate for the reclosing operation.

In the case where a plurality of customers using the same system have such types of distributed power supplies and a power equipment with which a plurality of distributed power supplies are connected is formed, when each of the distributed power supplies of this equipment detects isolated operation for example by the ΔQ system, a circumstance may occur where the reactive power of a certain power supply fluctuates in the manner, +ΔQ, −ΔQ, +ΔQ, −ΔQ, . . . while the reactive power of another power supply fluctuates in the manner, −ΔQ, +ΔQ, −ΔQ, +ΔQ, . . . , and in this case, the power fluctuations of these power supplies will cancel each other out, making detection of isolated operation difficult.

Thus with such power equipment, there is a need to use some form of synchronization means to adjust the detection timings of the respective distributed power supplies.

Further, as a conventional art, the present applicant has disclosed in Japanese Unexamined Patent Publication No. Hei. 10-248168 (H02J 3/38), etc. inventions with which an interharmonic (intermediate-order harmonic), which is synchronized with the system fundamental and has a frequency that is a non-integer multiple of the system fundamental, is injected into a power system, the interharmonic is detected from measurement signals of the voltage and/or current of the system, and the stoppage of the system is detected based on this detection result to detect and stop the isolated operation of a customer's distributed power supply upon stoppage due to a fault interruption, etc. of the power system.

In this case, since the interharmonic is of a frequency that does not exist inherently in the system, an advantage is provided in that the stoppage of the system can be detected by the supplying (injection) of an interharmonic of a small amount corresponding for example to approximately 0.1% of the system supply.

When, as described in the above-mentioned patent publication, a timing command, which has a sampling frequency that is PLL synchronized with the system voltage, is formed and the measurement signals of the voltage and current of the system are sampled based on this command, though the interharmonic of the injected order can be extracted and detected by subjecting the sampling data to a digital filter process based on a known Fourier transform at good precision without being affected by the system fundamental and harmonics having frequencies that are integer multiples of the fundamental system, in other words, the system components, a complex PLL circuit, etc. is required and the detection cannot be performed in an inexpensive and simple manner.

Meanwhile, if the PLL circuit for PLL synchronization is eliminated, a timing command for performing sampling in a non-synchronous manner with respect to the voltage of the power system (shall be referred to hereinafter as the system voltage) is formed, and the measured signals are sampled based on this command, though the arrangement will be lower in cost and simpler than the case where a PLL circuit is used, errors in the system voltage will arise in the extraction by Fourier transform, making detection of high precision difficult and disabling detection all together in some cases.

The same problems occur not only in the above-described case of detection of isolated operation of a distributed power supply but also when a fixed frequency sampling system is employed in cases where an interharmonic is injected into the system, the measurement signals of voltage and/or current of the system are sampled, and the interharmonic contained in the measured signals are extracted by a Fourier transform method to measure the harmonic characteristics of the system, etc.

SUMMARY OF THE INVENTION

A first object of this invention is to enable prevention of isolated operation of a distributed power supply and power fluctuation compensation (flicker fluctuation compensation) in the same manner as in the conventional art while enabling such types of customer equipment to be made small in scale and equipment investments by the customer to be lessened.

In order to achieve the above object, a first embodiment of this invention provides an isolated operation prevention device for distributed power supply, which is equipped with a power fluctuation monitoring unit, which monitors and detects the power fluctuation of the flicker fluctuation, which accompanies the fluctuation of wind power, etc., at the receiving point from the measurement results of the voltage at the intermediate-order harmonic current injection point and the current in the incoming line, a power compensation unit, which, based on the power fluctuation detection result, forms a compensation power injection signal for canceling out the power fluctuation, and an inverter device, which is driven and controlled by a signal obtained by adding the compensation power injection signal to the intermediate-order harmonic current injection signal and injects the intermediate-order harmonic current and the compensation power into the injection point.

The flicker fluctuation of the power at the receiving point, which is based on fluctuation of the power generated by the distributed power supply comprised of a wind power generator, etc., is thus detected by the power fluctuation monitoring unit, and based on this detection, the power compensation unit forms a compensation power injection signal that cancels out the power fluctuation.

The driving of the inverter device is then controlled by the signal obtained by adding the intermediate-order harmonic current injection signal and the compensation power injection signal, and this inverter device is used for the injection of the intermediate-order harmonic current and the injection of the compensation power, which cancels out the power fluctuation that is based on the fluctuation of the power generated by the distributed power supply.

A power fluctuation compensation function, which makes use of the inverter device, etc., is thus added to an isolated operation prevention device for distributed power supply to form a receiving equipment that is eliminated of the solitary power compensation device of the conventional art to enable prevention of isolated operation of the distributed power supply and power fluctuation compensation (flicker fluctuation compensation) to be carried out in the same manner as in the conventional art while making the equipment scale small and lessening the equipment investment by the customer.

Next, a second object of this invention is to provide the function of injecting an interharmonic into the power supplied from a distributed power supply to detect isolated operation, without the provision of a separate SVC, etc.

Another aspect of the second object of this invention is to enable, in an electrical equipment with which a plurality of the above-mentioned type of distributed power supplies are connected in the system, the detection of the system interruption, which accompanies the stoppage of the system supply, by supplying an interharmonic into the system according to each distributed power supply and without mutual interference among the distributed power supplies to prevent isolated operation of each distributed power supply without fail.

In order to achieve the above objects, a second embodiment of this invention provides: a unit which adds a supply signal for the power of interconnected operation and an injection control signal for an interharmonic and supplies the addition result to a power converter connected to a system; a unit which detects the stoppage of the system supply based on a change of an electric quantity for the interharmonic; and a unit which prevents isolated operation based on the detection.

In this case, the power and the interharmonic are supplied serially from the distributed power supply into the system via the power converter.

Based on the measurement of the interharmonic in the system, the system interruption that accompanies the stoppage of the system supply is detected from the change of an electric quantity for the interharmonic. Based on the detection, isolated operation is prevented.

The system interruption that accompanies the stoppage of the system supply can thus be detected by the distributed power supply to prevent isolated operation of the distributed power supply.

Since an interharmonic is supplied to the system to detect the system interruption that accompanies the stoppage of the system supply and the system fundamental is not modulated, ill effects, such as flicker, beating, etc. will not occur in the system as in the conventional-art active detection systems (ΔQ system, ΔP system) and the system quality will not be lowered.

Furthermore, since the frequency of the interharmonic is higher than the system fundamental and a change in an electric quantity for the interharmonic will thus appear in the measurements rapidly, the system interruption that accompanies the stoppage of the system supply can be detected rapidly and thus disconnection from the system can be performed rapidly.

Also, according to this invention, a distributed power supply is equipped with a unit which adds a supply signal for the power of interconnected operation and an injection control signal for an interharmonic, which is for detection of isolated operation and has a frequency that is a non-integer multiple of the system fundamental, supplies the addition result to the power converter as a drive command signal, and causes the interconnection operation power and the current of the interharmonic to be supplied serially into the system from the power converter, a unit which detects the stoppage of the system supply from the change of the system's electric quantity for the interharmonic based on at least either the measurement of the voltage of the interharmonic or the measurement of the current of the interharmonic, and a unit which cuts off the power converter from the system based on the detection of stoppage of the system supply.

The power converter is thus driven by a drive command signal formed by adding a supply signal for the power of interconnected operation and an injection control signal for an interharmonic, which is for detection of isolated operation and has a frequency that is a non-integer multiple of the system fundamental. An alternating output, in which the interconnected operation power and the interharmonic are synthesized, is thus generated in the power converter and the interconnected operation power and the interharmonic current are supplied serially into the system based on this alternating output.

Also, based on at least either the measurement of the voltage of the interharmonic or the measurement of the current of the interharmonic, the system interruption that accompanies the stoppage of the system supply is detected from the change of the system's electric quantity for the interharmonic, and based on this detection of system interruption, the power converter is cut off from the system to disconnect the distributed power supply from the system and thereby prevent its isolated operation.

The prevention of isolated operation can thus be performed, in the same manner as the above-mentioned arrangement, by a more specific arrangement.

With the power equipment of this invention, in which a plurality of the distributed power supplies are connected, the frequency of the interharmonic is differed according to each distributed power supply.

Thus for each of the distributed power supplies, the system interruption that accompanies the stoppage of the system supply can be detected and isolated operation can be prevented without mutual interference among power supplies, and the isolated operation of the plurality of distributed power supplies that are connected to the system can be prevented without fail and without the provision of a means for synchronization among the power supplies.

Furthermore, with the distributed power supply, since an interharmonic for detection of isolated operation of the distributed power supply is supplied to the system along with the interconnected operation power and via the power converter, the detection of isolated operation by means of an interharmonic can be performed by the distributed power supply itself.

A third object of this invention is to extract and detect the interharmonic of injected order at good precision and while minimizing the effects of the system components by sampling the measurement signals of the voltage and/or current of a power system by a fixed frequency sampling system in which the frequency is constant and using a Fourier transform filter calculation of the sampling data.

In order to achieve the above objects this invention provides the voltage and/or current of the power system are sampled by a fixed frequency sampling system with which the sampling frequency is constant, the components of the interharmonic of injected order and interharmonics of non-injected orders above and below the injected order are extracted by a Fourier transform filter calculation of the sampling data, the errors, which are based on the system voltage contained in the extracted components of the interharmonic of injected order, are interpolated from the averages of the extracted components of the interharmonics of non-injected orders, and the errors are subtracted and eliminated from the extracted components of the interharmonic of injected order to detect the interharmonic of injected order.

The interharmonic that is injected into a power system can thus be extracted without the use of a PLL circuit, etc. and by performing sampling in an inexpensive and easy manner by fixing the sampling frequency.

With regard to the interharmonic of injected order that is extracted by the Fourier transform of the sampling data, since the errors, which are based on the system voltage and result from the non-synchronization of the system frequency and the sampling frequency are also contained in the components of interharmonic of non-injected orders above and below the injected order and these errors vary linearly in the range where the orders (frequencies) are close to each other, the errors for the injected order are determined from the average values of the components of the interharmonics of non-injected orders and are subtracted from the extracted components of the injected order.

The interharmonic of injected order can thus be detected at good precision by a fixed frequency sampling system.

For practical use, the interharmonic of injected order is preferably an interharmonic between the kth harmonic and the k+1th harmonic (where k is an integer greater than or equal to 2) and the injected frequency of the interharmonic is preferably determined from kf±mfo (where f is the frequency of the system fundamental, m is an integer of value 1, 2, . . . n−1, n is an integer greater than or equal to 2, fo is the injection interval of the interharmonic, and fo=f/n).

DETAILED DESCRIPTION OF THE PREFERRED EMBODIMENT

A first embodiment of this invention shall now be described with reference to FIGS. 1 and 2.

Figure 1:
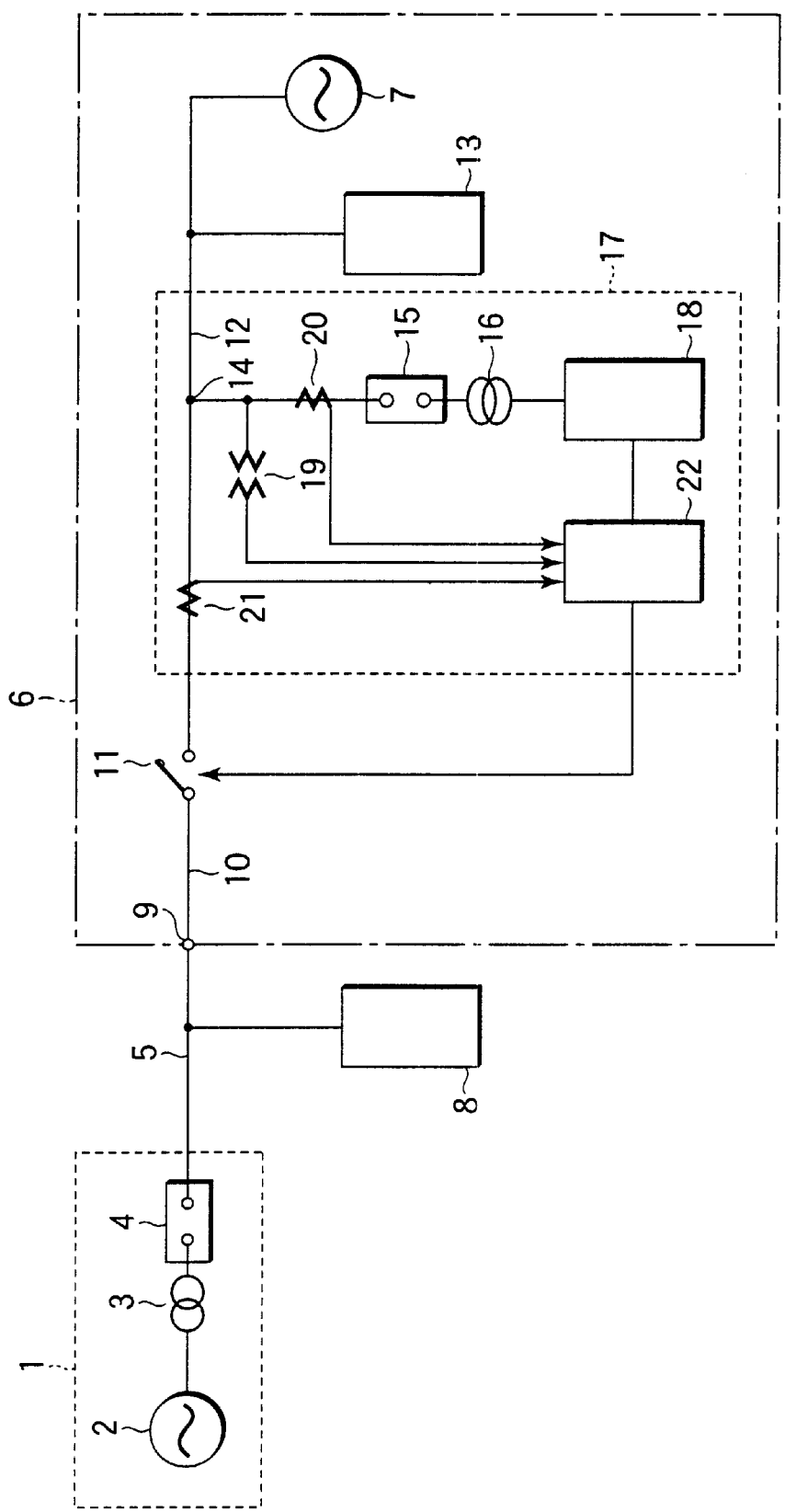
FIG. 1 is a one-line wiring diagram that shows the overall arrangement of a first embodiment of the present invention.
Figure 2:
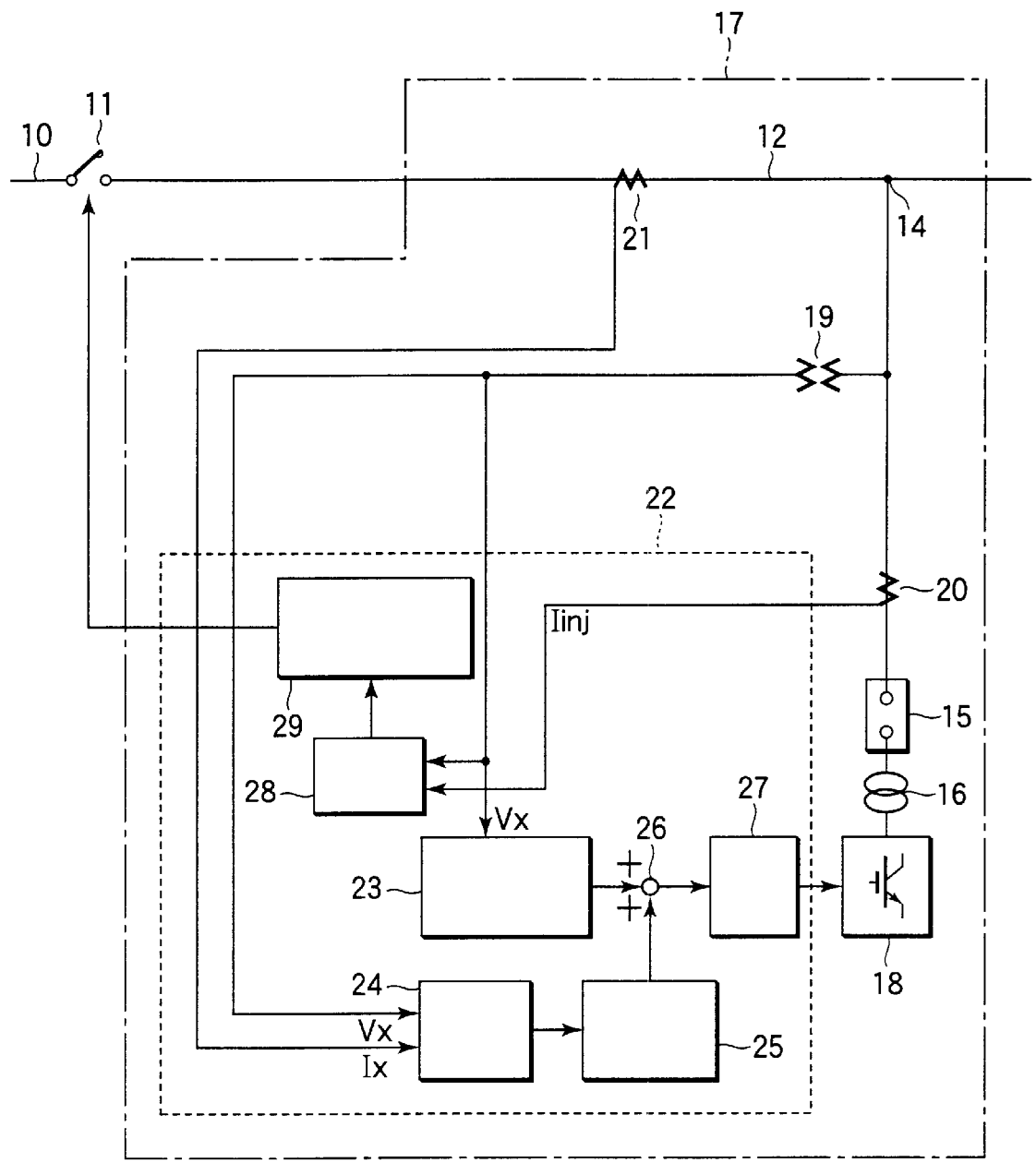
FIG. 2 is a detailed block wiring diagram of the control device of FIG. 1.

FIG. 1 is a one-line wiring diagram, which shows the overall arrangement of the embodiment. At distribution substation 1, a 3-phase system power supply 2 supplies power from the secondary side of a transformer 3 to the feed bus 5 at the load side via a circuit breaker 4.

In order to simplify the description, it shall be deemed that with feed bus 5, only the customer receiving equipment 6 in question has a distributed power supply 7 and that feed bus 5 is connected to receiving equipment 6 and one or a plurality of general loads 8.

Receiving equipment 6 has an interconnecting/disconnecting switch 11 connected to receiving point 9 via an incoming line 10, and the distributed power supply 7 and the one or a plurality of internal loads (local loads) 13 are connected to the local bus 12 at the load side of this switch 11.

Distributed power supply 7 is comprised of a wind power generator, etc. with a large capacity such that the generated power has an influence on the system voltage of buses 5 and 12. The power generated by distributed power supply 7 varies gradually in accompaniment with the average variations in wind power, and at the point of start-up and at times of wind power fluctuations, relatively large flicker fluctuations (ripple fluctuations) become overlapped onto each of the active and reactive components of the generated power.

In order to open switch 11 and disconnect distributed power supply 7 upon detection of stoppage of the system supply due to the opening of circuit breaker 4, an injection point 14 is provided near the load side of switch 11. The inverter device 18 of an isolated operation prevention device 17 is connected to this injection point 14 via a circuit breaker 15 and a voltage transformer 16, and the 3-phase or single-phase current of inverter device 18 is injected into injection point 14.

The voltage (system voltage) and injected current at injection point 14 are measured by means of an instrument voltage transformer 19 and an instrument current transformer 20, and the current that flows through incoming line 10 at the upstream side of injection point 14 is measured by means of an instrument current transformer 21.

The measured voltage signal of instrument voltage transformer 19 and the measured current signals of instrument current transformers 20 and 21 are supplied to control device 22. This control device 22 is equipped with the function of controlling the prevention of isolated operation of distributed power supply 7 and the function of controlling the prevention of voltage fluctuations, and is formed as shown in FIG. 2.

That is, during interconnected operation of distributed power supply 7, switch 11 is engaged and closed, and at this time, current flows and power is transported from distributed power supply 7 to the bus 5 side or from system power supply 2 to the bus 12 side in accordance with the voltage difference between the system power supply 2 arid distributed power supply 7, etc.

The voltage Vx measurement signal of instrument voltage transformer 19 and the injected current Iinj measurement signal of instrument current transformer 20 are supplied to intermediate-order harmonic injection control unit 23 of control device 22.

In order to control the driving of inverter device 18 and inject a small current, set to an intermediate-order harmonic frequency that is synchronized with the system fundamental and is a non-integer multiple, for example, of the 4.5th order or 5.5th order of the fundamental, into injection point 14, injection control unit 23 detects the system voltage of the fundamental by applying a filter process, etc. on the measurement signal of voltage Vx, detects the injected current of the intermediate-order harmonic by applying a filter process, etc. on the measurement signal of current Iinj, and forms a synchronizing signal, synchronized with the system fundamental, by PLL control based on the detected frequency of the injected current of the intermediate-order harmonic. The inverter is driven in accordance with the timing control by this synchronizing signal to form the intermediate-order harmonic current of a frequency that is synchronized with the system fundamental and is of a non-integer multiple of the frequency of the system fundamental.

The voltage Vx measurement signal, measured by instrument voltage transformer 19, and the measurement signal of the current Ix, which flows through incoming line 10 and is measured by instrument current transformer 21, are supplied to a power fluctuation computing unit 24 which serves as the voltage fluctuation monitoring unit, and based on the voltage Vx and current Ix, the computing unit 24 calculates the moment-to-moment flicker fluctuations (ripple fluctuations) of the active and reactive power that accompany the wind power fluctuations, etc.

The calculation results of power fluctuation computing unit 24 are supplied to a compensation power injection control unit 25, and this control unit 25 forms active and reactive compensation power injection signals that cancel out the calculated voltage fluctuations.

To be more specific, power conversion computing unit 24 and compensation power injection control unit 25 forms the compensation power injection signal in the following manner.

That is, in simple terms, the moment-to-moment active and reactive powers are calculated by multiplication of the vector quantities of voltage Vx and current Ix, the power calculation results are subject to a low-pass filter process of a suitable time constant to determine the powers from which the flicker fluctuations have been eliminated, the active and reactive flicker fluctuation voltage are determined by subtracting the powers from which flicker fluctuations have been eliminated from the calculated active and reactive powers, the active and reactive powers for canceling out the flicker fluctuation powers are determined as compensation powers, which are then multiplied by the system voltage to determine the currents corresponding to the respective compensation powers, and the compensation power injection signals are formed from the injection signals of these currents.

Figure 6:
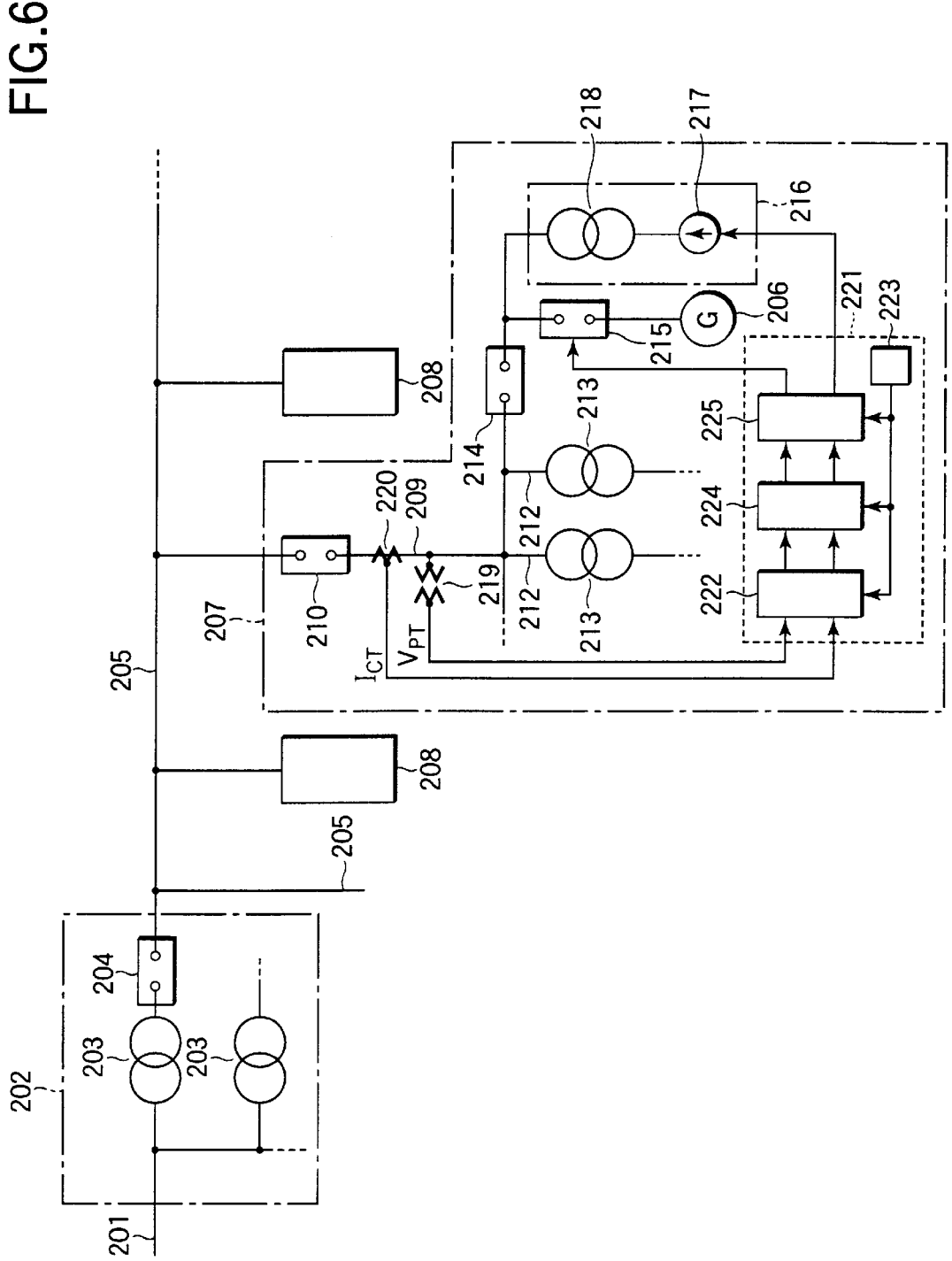
FIG. 6 is a one-line wiring diagram of a third embodiment of this invention.

In the case where the total fluctuation current detection system, described in p. 31 of the above-mentioned Nisshin Electric Technical Report Vol. 41, No. 3 ('96, 11), is to be implemented, power conversion computing unit 24 and compensation power injection control unit 25 are formed from the "3-phase balanced active current detection circuit," the "steady active current detection circuits for the respective phases," the "steady reactive current detection circuits for the respective phases," etc. that are illustrated in FIG. 6 of the same page.

In this total fluctuation current detection system, the compensation current is determined by subtracting the components that do not need to be compensated from the current to be compensated. First, the 3-phase balanced active current component is detected and subtracted from the currents Ix of the respective phases, then the steady state active current and reactive current, which have been detected or set for each phase, are subtracted to determine the current corresponding to the flicker fluctuation reactive power and the unbalanced power, and the current that cancels out this current is formed as the compensation power injection current.

The injection signal from intermediate-order harmonic injection control unit 23 and the injection signal from compensation power control unit 25 are added by an adder 26, the added signal of the injection signals is supplied to a gate signal forming unit 27. A gate signal for driving the inverter device 18 which corresponds to the added signal of the injection signals is formed by this forming unit 27. The inverter device 18 is driven by this gate signal.

In this driving scheme, inverter device 18 outputs a synthetic signal of the injected current of the intermediate-order harmonic and the compensation power current and injects this current into injection point 14.

By the injection of the compensation power current, the flicker fluctuations of the power generated by distributed power supply 7 are restricted and fluctuations of the system voltage are prevented.

Meanwhile, in order to inject an intermediate-order harmonic current to detect the stoppage of the system supply, the measurement signals of voltage Vx and current Iinj are supplied to a system impedance computing unit 28. This computing unit 28 performs for example A/D conversion and digital Fourier analysis of the voltage Vx and the current Iinj, detects the voltage and current of the injection frequency (intermediate-order harmonic) at receiving point 9, and determines the moment-to-moment impedance (admittance) at the system supply side for the intermediate-order harmonic current with respect to receiving point 9 by computing the voltage/current (current/voltage) based on the detection results.

The computation result of this impedance (admittance) is then supplied to disconnection control unit 29, and by means of this control unit 29, the stoppage of the system supply is detected from a change of the impedance (admittance).

To be more specific, in the present embodiment, the method of detecting the stoppage of the system supply from the capacitive change of the impedance (admittance), as described in the above-mentioned Japanese Patent Unexamined Publication Hei 11-252806, is employed and variation of more than or equal to a fixed value in the capacitive direction is detected from the positive or negative sign and magnitude of the difference between the moment-to-moment impedance (admittance) and the immediately prior impedance (admittance) to detect the stoppage of the system supply that accompanies the opening of circuit breaker 4.

When this stoppage of the system supply is detected, switch 11 is opened by disconnection control unit 29 to cut off distributed power supply 7 from the power system and prevent isolated operation of distributed power supply 7.

The isolated operation prevention device 17 thus uses inverter device 18 for both injection of the intermediate-order harmonic current and injection of the compensation power to prevent the isolated operation of distributed power supply 7 and perform power fluctuation compensation.

A receiving equipment can thus be formed by eliminating the solitary power fluctuation compensation device of the conventional art to enable the equipment scale to be made small and the equipment investment by the customer to be lessened significantly.

The arrangements of the respective parts of control unit 17, the power fluctuation detection methods, etc. are not limited to those of the above-described embodiment, and for example with regard to the detection of the stoppage of the system supply, whereas the interruption was detected from the capacitive change of impedance or admittance for the intermediate-order harmonic current at the upstream side of the system, the stoppage may also be detected from a change of the magnitude of the impedance or admittance as indicated in the above-mentioned Japanese Patent Unexamined Publication No. Hei 10-248168.

A second embodiment of this invention shall now be described with reference to FIGS. 3 through 5.

Figure 3:
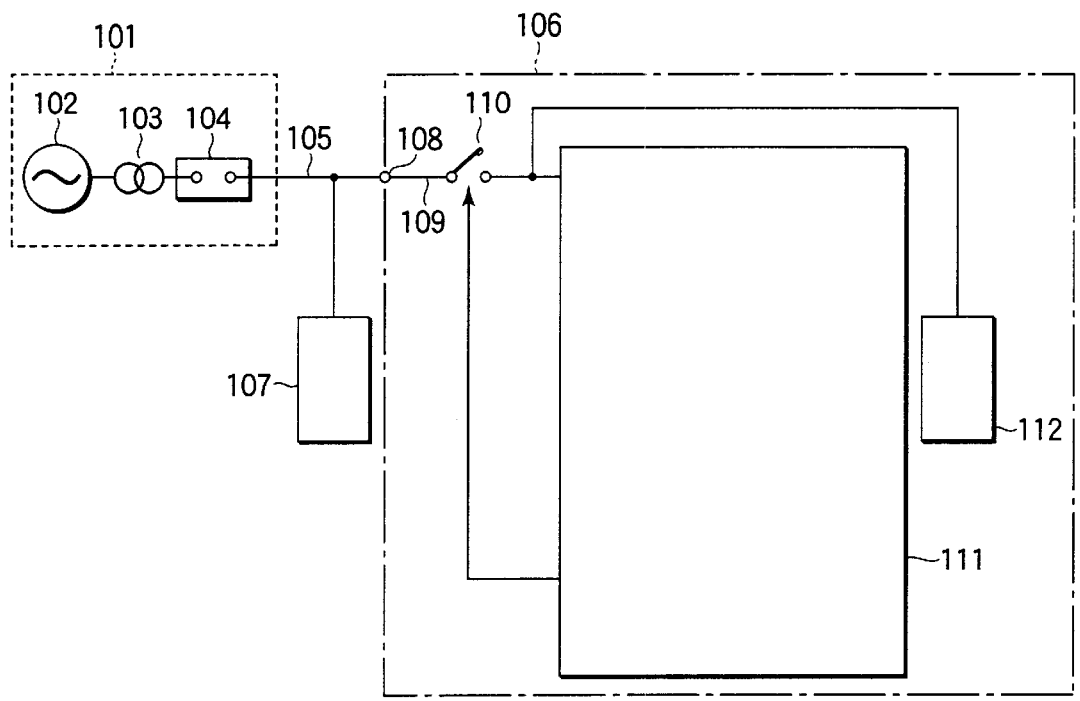
FIG. 3 is a one-line wiring diagram of a second embodiment of this invention.

FIG. 3 is a one-line wiring diagram that shows the overall arrangement of an example of a distribution system. A distribution line 105 is connected via transformer 103 and circuit breaker 104 to a 3-phase system power supply 102 of a distribution substation 101, and the customer receiving equipment 106 being considered and one or a plurality of general loads 107 are connected to this distribution line 105.

Receiving equipment 106 has a normally-closed interconnecting/disconnecting switch 110 connected to receiving point 108 via an incoming line 109, and a distributed power supply 111 and one or a plurality of internal loads (local loads) 112 are connected to the load side of this switch 110.

Figure 4:
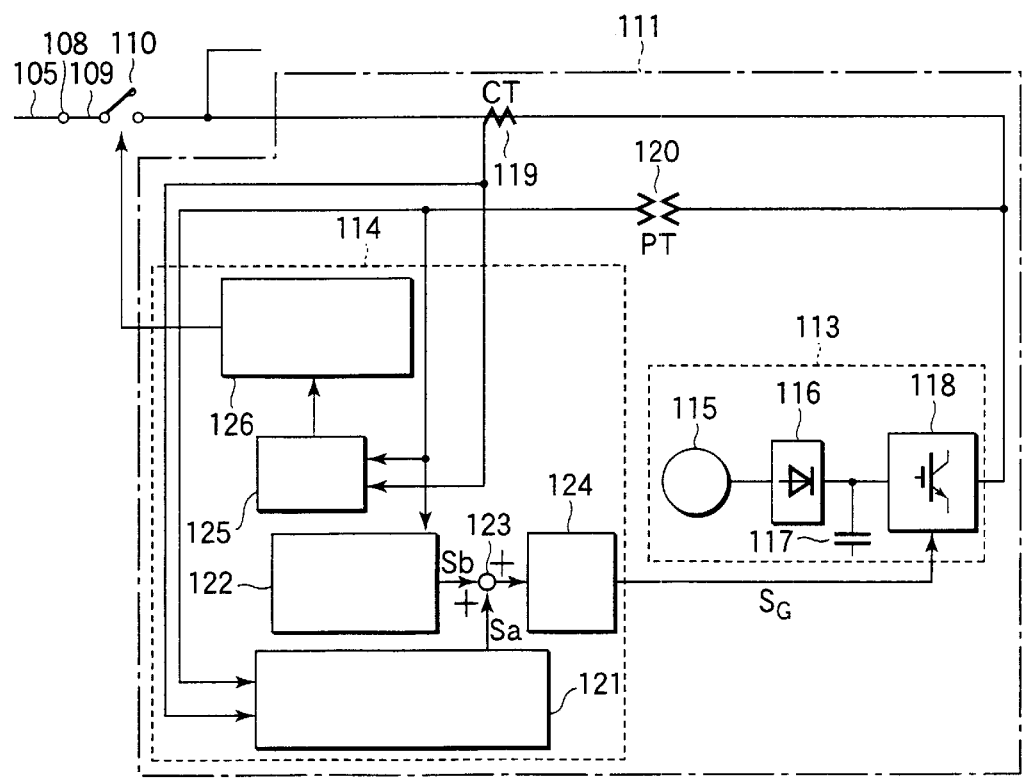
FIG. 4 is a detailed one-line wiring diagram of a part of FIG. 3.

FIG. 4 is a one-line wiring diagram that shows the arrangement of distributed power supply 111, and distributed power supply 111 is for example comprised of the generator unit 113 of a wind power generating system and a control device 114 for generator unit 113.

Generator unit 113 converts the AC output of a wind power generator 115 into DC by means of a rectifier 116, and supplies this DC to an inverter or other power converter 118 via an energy storage capacitor 117.

This power converter 118 is driven for example by PWM control by a drive command signal $S_G$ supplied from control device 114, and the alternating output thereof is injected into distribution line 105 via switch 110 and incoming line 109.

An instrument current transformer 119 and an instrument voltage transformer 120 are provided at the output side of voltage converter 118, and the current measurement signal of current transformer 119 and the voltage measurement signal of voltage transformer 120 are supplied to power supply control unit 21 of control device 114. Based on both measurement signals, control unit 121 detects the current Ij and the voltage Vj of the system fundamental and forms a supply signal Sa for example by a current control method.

By means of the current injection control unit 122 of control device 114, the voltage Vj of the system fundamental is detected from the measurement signal from voltage transformer 120. And by PLL control based on the detected frequency, the injection control signal Sb of a current of an interharmonic, which is synchronized with the system fundamental and is of a non-integer multiple of the system fundamental, that is, of the 2.375th order for example, is formed as the signal for isolated operation detection.

The supply signal Sa and injection control signal Sb are added by adder 123 and the added signal is supplied to gate signal forming unit 124. In accordance with the addition signal, forming unit 124 forms a gate signal for PWM control waveform drive and supplies this gate signal as drive command signal $S_G$ to power converter 118.

Power converter 118 is thus used in both the inherent role of supplying the power of distributed power supply 111 and the role of supplying the interharmonic current for isolated operation detection, and supplies the interconnected operation power based on supply signal Sa and the interharmonic current based on injection control signal Sb serially into distribution line 105 via incoming line 109.

The current measurement signal of current transformer 119 and the voltage measurement signal of voltage transformer 120 are supplied to isolated operation detection unit 125 of control device 114, and this detection unit 125 detects the system interruption that accompanies the stoppage of the system supply from a change of the system's admittance (change of electric quantity) for the interharmonic with respect to receiving equipment 106. Though the system interruption may also be detected from a change of impedance, change of voltage, or change of current, the case where the system interruption is detected from a change of admittance shall be described here.

That is, after performing A/D conversion of the measurement signals from current transformer 119 and voltage transformer 120, detection unit 125 performs digital frequency analysis by FFT, DFT, etc. to determine the moment-to-moment injected current and injected voltage (vector quantities) of the interharmonic and calculates the admittance (=injected current/injected voltage).

Here, since the interharmonic current is a current of a frequency that does not exist inherently in distribution line 105, and since the admittance of load 112 is sufficiently small in comparison to the admittance of the system, the system admittance with respect to customer equipment 6, in other words, with respect to receiving point 108 will be measured at good precision.

When circuit breaker 104 is opened and the system interruption that accompanies the stoppage of the system supply occurs, service line 105 enters the power supply opened condition with respect to receiving point 108 and the admittance thereof changes in a decreasing manner.

A specific example of the change of the susceptance component of the above-mentioned admittance due to system interruption shall now be described with reference to FIGS. 5A to 5D.

FIG. 5A shows the voltage of the system fundamental at service line 105 with respect to receiving point 108, FIG. 5B shows the voltage of the injected order of the interharmonic, FIG. 5C shows the current of the injected order of the interharmonic, and FIG. 5D shows the susceptance component (absolute value) of the interharmonic as detected by calculation using the voltage of the injected order of FIG. 5B and the current of the injected order of FIG. 5C.

Figure 5:
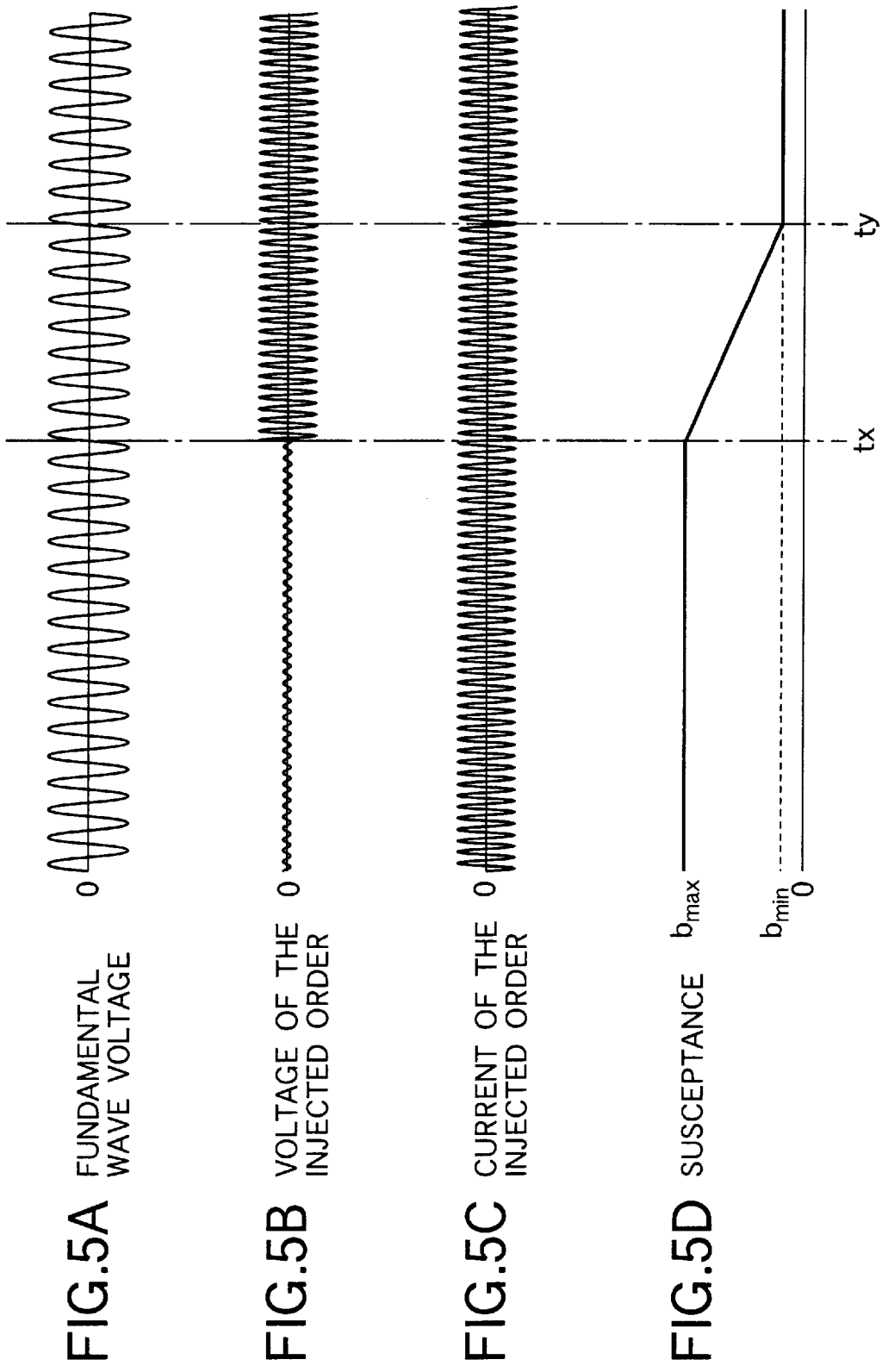
FIGS. 5A to 5D are waveform diagrams for explaining the operation of the part shown in FIG. 4.

The time tx in FIG. 5 indicates the timing at which the system interruption (in other words, the isolated operation) that accompanies the opening of circuit breaker 104 and the stoppage of the system supply occurs, and prior to time tx, since the impedance of the system at distribution line 105 is small, the injected interharmonic voltage is small and the susceptance component thereof is maintained at a large fixed value $b_{max}$.

When circuit breaker 104 is opened at time tx and the system interruption that accompanies the stoppage of the system supply occurs and distributed power supply 111 undergoes the transition from interconnected operation to isolated operation, the supply of power at that time and the current injection of the interharmonic is continued The system fundamental voltage at receiving point 108 does not change. Since, as viewed from receiving point 108, the system at distribution line 105 changes to the power supply opened condition and since the injected interharmonic current is fixed, the injected interharmonic voltage becomes large, and in accompaniment with this change of injected voltage, the susceptance component decreases.

Based on this decreasing change of the susceptance component, the system interruption can be detected extremely rapidly.

To be more specific, in the case where the system's susceptance component for the interharmonic is to be detected from the average of the frequency analysis data for example for eight periods of the system fundamental, since at the time ty, which lies eight system fundamental periods Latex time tx (i.e. 1/60 seconds×8=0.15 seconds after time tx), all of the data at receiving point 108 for the eight consecutive periods up to that time will have decreased to the fixed value $b_{min}$ of the power supply opened condition, the system interruption can be detected rapidly within 0.15 seconds from its occurrence by setting a suitable value between $b_{max}$ and $b_{min}$ as the threshold susceptance for detection of interruption.

Based on this detection of system interruption, a disconnection command signal is output from isolated operation detection unit 125 to disconnection control unit 126, and by this control unit 126, switch 110 is opened to cut off the distributed power supply 11 from distribution line 105 and thereby prevent isolated operation of distributed power supply 111.

Adder 123 and gate signal forming unit 124 form: an unit which adds the supply signal for the power of interconnected operation and the injection control signal for the interharmonic and supplies the added signal to the connected power converter; and an unit which adds the supply signal for the power of interconnected operation and the injection control signal for the interharmonic, which is for detection of isolated operation and has a frequency that is a non-integer multiple of the system fundamental, supplies the addition result to the power converter as a drive command signal, and causes the interconnection operation power and the interharmonic to be supplied serially into the system from the power converter.

Also, isolated operation detection unit 125 is the units which detects the stoppage of the system supply, and disconnection control unit 126 and switch 110 comprise the unit which prevents isolated operation, and the unit which cuts off the power converter from the system.

Thus with the present embodiment, the power converter 118 of distributed power supply 111 can be used both for the supplying of the interconnected operation power based on wind power generation and the supplying of the interharmonic for isolated operation detection to enable the serial supplying of the interconnected operation power and the interharmonic current for interruption detection into distribution line 105 from distributed power supply 111 and the prevention of isolated operation of distributed power supply 111. There is thus no need to provide an SVC, etc. apart from the distributed power supply to inject the interconnected operation power of the distributed power supply and the interharmonic current in a parallel manner, and isolated operation of distributed power supply 111 can be prevented without fail by means of distributed flower supply 111 itself.

Since the amount of the interharmonic current injected is of an extremely small level regardless of, whether or not an interharmonic already exists in the system and is 0.01% or less of the fundamental, the voltage distortion in power system 105 will be limited to approximately 0.1% and will not present any problem in terms of interconnected operation. The capacity of power converter 118 is practically determined by the wind power generation amount.

Since the system interruption that accompanies the stoppage of the system supply is detected from a change of the system's admittance for the interharmonic, the system fundamental does not have to be modulated as in the conventional active detection systems (ΔQ system, ΔP system) and the system will not be subject to flicker or beating effects.

Also, since the interharmonic is of a higher frequency than the system fundamental, the power interruption that accompanies the stoppage of system supply can be detected rapidly, for example, within 0.15 seconds of occurrence, and the distributed power supply 111 can be cut off from distribution line 105 immediately.

Thus even if the reclosing time of a system that is one level above distribution line 105 in less than 3 seconds, distributed power supply ill can be cut off from the system prior to the reclosing and thus definitely accommodate for this reclosing operation.

There are no special restrictions concerning the frequency, in other words, the order of the interharmonic in the case where distribution line 105 is of a high-voltage system that is lead out from a so-called secondary substation, etc. However, in the case where distribution line 105 is of a low-voltage distribution system, since a capacitor for power factor improvement will always exist in such a system, the order of the interharmonic is normally restricted to less than 4 as indicated in the specification of the above-mentioned Japanese Patent Unexamined Publication No. Hei-10-248168.

Since the impedance is the reciprocal of the admittance, it is needless to say that the change of impedance may be used as the change of the system's electric quantity for the interharmonic with respect to receiving equipment 106 and the system interruption may be detected by interruption detection unit 125 from a change in the increasing direction of the impedance for the interharmonic.

Also, in the case of a system with which the injected current or voltage of the interharmonic does not vary, a change of voltage or a change of current may be used as the change of electric quantity for the interharmonic and the system interruption may be detected from a change of voltage or change of current for the interharmonic of the injected order at a suitable monitoring point (measurement point) in distribution line 105. And in this case, just the voltage or current of the interharmonic will have to be measured.

Furthermore, the cutting off of power converter 118 from the system may be performed electrically by the stopping of the driving of power converter 118 instead of by the opening of switch 110.

Also, needless to say, generator unit 113 is not limited to a wind power generation system but may be any of various generation systems, such as micro gas turbine generation systems, solar power Generation systems, fuel cell systems, emergency power supply systems that use a generator, flywheel, etc., UPS, constant-use power supply systems (cogeneration equipment), etc., which are equipped with a power converter corresponding to power converter 118.

In the case where the receiving equipment of a plurality of the customers of distribution line 105 are equipped with distributed power supplies 111 and the power equipment of the entire system of distribution line 105 is formed by connecting a plurality of distributed power supplies 111, the frequency of the interharmonic current for isolated operation detection is differed for each distributed power supply 111, and the injection control signal Sb is formed for the interharmonic of frequency that is differed according to distributed power supply 111 and the resulting interharmonic is injected into distribution line 105 by means of the injection control unit 123 of each distributed power supply 111.

For example, if five distributed power supplies 111 continue to be connected, currents of interharmonics of the 2.125th order {=(2+1/8th) order}, 2.25th order {=(2+2/8th) order}, 2.375th order {=(2+3/8th) order}, 2.5th order {=(2+4/8th) order}, and 2.625th order {=(2+5/8th) order} may be used.

In this case, since the frequencies (orders) of the injected interharmonic currents differ according to distributed power supply 111, mutual interference among the currents will not occur, and system interruption can be detected without fail and isolated operation can be prevented by means of each distributed power supply 111 and without having to provide a means for synchronization among the power supplies 111.

A third embodiment of this invention shall now be described with reference to FIGS. 6 to 8.

FIG. 6 is a one-line wiring diagram of an example of a power system. The primary sides of one or a plurality of transformers 203 of a substation 202 are connected to an upper-level system 201, and one or a plurality of lower-level power systems 205 are lead out in branching manner via a circuit breaker 204 from the secondary sides of the respective transformers 203.

These power systems 205 are connected to a plurality of customer equipment, such as a customer equipment 207, having a distributed power supply 206, a general customer equipment 208, which is not provided with a distributed power supply 206, etc.

As with the other customer equipment, the customer equipment 207 to which this invention is applied has a load bus 211 connected to the power system 205 via a circuit breaker 210 of incoming line 209. And the respective loads are connected to this load bus 211 via the transformers 213 of the respective load feeders 212.

A circuit breaker 214 is connected to load bus 211, and distributed power supply 206 and an interharmonic current injection device 216 are connected to this circuit breaker 214 via a disconnection switch 215.

Current injection device 216 is formed from an inverter or other power supply unit 217, which outputs the injected current of the interharmonic, and an injection transformer 218, provided between power supply unit 217 and load bus 211.

Also, a receiving point voltage transformer 219 and a receiving point current transformer 220 are provided at the load bus 211 side of circuit breaker 210 of incoming line 209, and the measurement signals of the voltage and current of these transformers are supplied to a sample/hold circuit 222 of a system stoppage detection processing device 221.

Sample/hold circuit 222 samples and holds the measurement signals asynchronously with respect to the system voltage and system current by a fixed frequency sampling system in accordance with a sampling command timing signal of constant frequency generated by a timing command unit 223 formed by a constant frequency generator, such as a quartz oscillator, etc., and the output of sample/hold circuit 222 is converted into digital signals and made into the sampling data by an A/D conversion circuit 224 at the subsequent stage.

The sampling data of the voltage and current, which were converted into digital signals by A/D conversion circuit 224, are then supplied to computing processor 225. This processor 225 is formed from a microcomputer, etc. and by its software process, the sampling data are subject to a known digital filter process based on the Fourier transform to extract and detect the interharmonic of injected order that has been injected from current injection device 216 into power system 205, and the system stoppage in which the circuit breaker 104 is opened, in other words, the isolated operation of distributed power supply 206 is monitored and detected from the changes in the interharmonic.

Upon detection of this isolated operation, a disconnection command is supplied from computing processor 225 to switch 215. Switch 215 is opened to cut off distributed power supply 206 from power system 205.

When the system is normal, all of the circuit breakers 204, 210, and 214 and the switch 215 are closed, the power of the upper-level system 201 is supplied to power system 205. And power system 205 is in the power supplying condition.

At this time, distributed power supply 206 is operated in interconnection with power system 205, and the output thereof is consumed within the local equipment 207 and the excess is output via incoming line 209 to power system 205.

At customer equipment 207, the voltage at receiving point A of FIG. 6 and the current that flows in and out of receiving point A are constantly measured by receiving point voltage transformer 219 and receiving point current transformer 220.

Computing processor 225 periodically outputs a starting command to power supply unit 217 in synchronization with the timing signal of constant frequency supplied from timing command unit 223. Based on this command, power supply unit 217 forms interharmonic currents of one or a plurality of frequencies that are synchronized with the above-mentioned timing signal, and these injected currents, which are asynchronous with respect to the system fundamental, are injected from receiving point A of customer equipment 207 into power system 205 via voltage transformer 218, load bus 211, and incoming line 209.

Due to this injection, interharmonic voltage and currents are contained in the measurement signals of receiving point voltage transformer 219 and receiving point current transformer 220.

Based on the timing signal of timing command unit 223, the measurement signals are sampled and held asynchronously with respect to the system voltage and system current of power system 205 by the sampling by the fixed frequency sampling system of sample/hold circuit 222 as described above.

The hold outputs of the voltage and current are converted into digital signals by A/D conversion circuit 224, and the sampling data resulting from the conversion into digital signals are processed by computing processor 225 to extract and detect the injected interharmonic voltages and currents.

When circuit breaker 204 is opened by the stoppage of power system 205, since the power supply impedance of power system 205 with respect to receiving point A changes from the closed impedance to the open impedance, the stoppage of power system 205, in other words, the isolated operation of distributed power supply 206 can be detected from the change of power system 205's impedance or admittance (shall be referred to hereinafter as impedance, etc.) for the interharmonic of injected order with respect to receiving point A.

For the simplification of computation, etc., the isolated operation of distributed power supply 206 may be detected from changes of the voltages and/or currents of the detected interharmonics.

Computing processor 225 monitors and detects the isolated operation of distributed power supply, based on the stoppage of the system supply, from changes of the voltage and/or current of the interharmonics of injected orders or changes of power system 205' impedance or admittance for the interharmonics of injected orders.

Since the interharmonic current injection by injection device 216 and the sampling by sample/hold circuit 222 are performed asynchronously with respect to the system voltage and system current by the timing signal of timing command unit 223, the sampling data of the interharmonics of injected orders contain errors due to this asynchronization and the extracted components of the interharmonics of injected orders, which are extracted by Fourier transform, contain the influences of the above-mentioned errors.

Computing processor 225 thus interpolates, subtracts, and thereby eliminates the above-mentioned errors in the following manner.

First, the interharmonics that are injected into power system 205 and are sampled shall be described.

If the frequency of the system fundamental of 60 Hz or 50 Hz of power system 205 (the prescribed frequency of commercial power supply) is f, the injected frequency of an interharmonic is finj, the number of divisions of frequency f that defines the number of injections is n, and the interval of the injected frequency finj that is based on this number of divisions n is $f_o$, $f_o=f/n$, and the angular frequency $\omega_o$ is given as $\omega_o=2\pi f_o=2\pi f/n$.

Thus if f=60 Hz and n=30, $f_o$=60/30=2 Hz.

The interharmonics lie between the kth harmonic and the k+1th harmonic (k=2, 3, . . . ) and if the interharmonics are deemed to be of m channels in the order starting from the interharmonic closest to the kth harmonic (m=1, 2, 3, . . . , (n−1)), the frequency finj and the angular frequency $\omega$inj of the k.mth-order interharmonic are expressed by the following two equations, Equation 1 and Equation 2.

$$finj = kf + mf_o \quad \text{[Equation 1]}$$

$$\omega inj = 2\pi(kf+mf_o) = kn\omega_o + m\omega_o = (k \cdot n + m)\omega_o \quad \text{[Equation 2]}$$

If the k.mth-order interharmonic is indicated as Finj(t) (where t is the time), the amplitude of this interharmonic is 1, and the initial phase of this interharmonic is θm, this interharmonic Finj(t) can bin expressed by the following Equation 3.

$$Finj(t) = \sin\{(kn+m)\cdot\omega_o t + \theta m\} \quad \text{[Equation 3]}$$

Meanwhile, with regard to the system fundamental of power system 205 and the harmonics of integer multiple frequencies thereof, in other words, with regard to the system components, if the frequency fluctuation Δ of the system components is considered, the existing system components F(t), from the fundamental to the first-order harmonic, are expressed by Equation 4, with V1 being the amplitude and φ1 being the of the first-order harmonic.

$$F(t) = \sum_{l=1}^{l} Vl\sin\{\ln\omega_o(1+\Delta)t + \varphi l\} \quad \text{[Equation 4]}$$

Thus when an interharmonic current or voltage is injected into power system 205, the measurement signals of voltage transformer 219 and current transformer 220, in other words, the input signal Fin(t) contained in the voltage and current at sample/hold circuit 222 will be as expressed by the following Equation 5 that results from the additive synthesis of Equations 3 and 4.

$$Fin(t) = \quad \text{[Equation 5]}$$

$$\sum_{l=1}^{l} Vl\sin\{\ln\omega_o(1+\Delta)t + \varphi l\} + \sin\{(kn+m)\omega_o t + \theta m\}$$

The first term (F(t)) and the second term (Finj(t)) of the right hand side of Equation 5 are asynchronous since F(t) contains the frequency fluctuation Δ while Finj(t) does not contain the frequency fluctuation Δ.

The equation for extraction of the interharmonics by Fourier transform (Fourier integration) and the system component errors shall now be described, starting from the principles of Fourier transform integration.

First, the cosine component (cos component) Cm and the sine component (sin component) Sm of the k.mth-order interharmonic, which is contained in input signal Fin(t) and is expressed by Equation 3, can be extracted by the known Fourier transforms (Courier integrations) of Equations 6 and 7. These Equations 6 and 7 are the principal equations of the digital filter process in the fixed frequency sampling system that is asynchronous with the system frequency.

$$C_m = \frac{\omega 0}{\pi} \int_0^{\frac{2\pi}{\omega 0}} Fin(t)\sin\{(kn+m)\omega t0\}dt \quad \text{[Equation 6]}$$

$$Sm = \frac{\omega 0}{\pi} \int_0^{\frac{2\pi}{\omega 0}} Fin(t)\cos\{(kn+m)\omega t0\}dt \quad \text{[Equation 7]}$$

When Equation 5 is substituted into the Fin(t) terms of Equations 6 and 7, the following Equations 8 and 9 are obtained.

$$Cm = \frac{\omega 0}{\pi} \int_0^{\frac{2\pi}{\omega 0}} \sum_{l=1}^{l} [Vl\sin\{\ln(1+\Delta)\omega 0 t) + \varphi l\} \quad \text{[Equation 8]}$$

$$\sin(kn+m)\omega 0 t]dt + \cos\theta m$$

$$Sm = \frac{\omega 0}{\pi} \int_0^{\frac{2\pi}{\omega 0}} \sum_{l=1}^{l} [Vl\sin\{\ln(1+\Delta)\omega 0 t) + \varphi l\} \quad \text{[Equation 9]}$$

$$\cos(kn+m)\omega 0 t]dt + \sin\theta m$$

The first terms (integration terms) of the right hand sides of Equations 8 and 9 are the error terms ΔC and ΔS, respectively, which are based on the influence of the system components.

The total error ΔS+jΔC of the extracted components, which is based on the errors ΔC and ΔS, is determined by the following Equation 10.

$$\Delta S + j\Delta C = \sum_{l=1}^{l} \frac{\omega 0}{\pi} \int_0^{\frac{2\pi}{\omega 0}} [Vl\sin\{\ln(1+\Delta)\omega 0 t + \varphi l\}] \quad \text{[Equation 10]}$$

$$e^{j(kn+m)\omega 0 t}dt$$

$$= \sum_{l=1}^{l} Vl \frac{\omega 0}{\pi} \int_0^{\frac{2\pi}{\omega 0}} \frac{1}{2j}[e^{j\{\ln(1+\Delta)\omega 0 t+\varphi l\}}] -$$

$$[e^{j\{\ln(1+\Delta)\omega 0 t+\varphi l\}}]e^{j(kn+m)\omega 0 t}dt$$

$$= \sum_{l=1}^{l} Vl \frac{\omega 0}{\pi} \frac{1}{2j} \left[ \int_0^{\frac{2\pi}{\omega 0}} e^{j\varphi l}e^{j\{\ln(1+\Delta)+(kn+m)\}\omega 0 t}dt - \right.$$

$$\left. \int_0^{\frac{2\pi}{\omega 0}} e^{j\varphi l}e^{j\{\ln(1+\Delta)-(kn+m)\}\omega 0 t}dt \right]$$

The results of integration in time of the first and second terms of the rightmost side of Equation 10 will be as shown by the following Equations 11 and 12.

[Equation 11]

$$\frac{\omega 0}{\pi}\frac{1}{2j}\int_0^{\frac{2\pi}{\omega 0}} e^{j\{[\ln(1+\Delta)+(kn+m)]\omega 0 t+\varphi l\}} dt = \frac{\omega 0}{\pi}\frac{1}{2j}\frac{1}{j\{\ln(1+\Delta)+(kn+m)\}\omega 0}$$

$$[e^{j\{[\ln(1+\Delta)+(kn+m)]\omega 0 t+\varphi l\}}]_0^{\frac{2\pi}{\omega 0}}$$

$$= \frac{\omega 0}{\pi}\frac{1}{2j}\frac{1}{j\{\ln(1+\Delta)+(kn+m)\}\omega 0}$$

$$[e^{j\{[\ln(1+\Delta)+(kn+m)]2\pi+\varphi l\}} - e^{j\varphi l}]$$

$$= \frac{\omega 0}{\pi}\frac{1}{2j}\frac{1}{j\{\ln(1+\Delta)+(kn+m)\}\omega 0}$$

$$[e^{j\{\ln\Delta 2\pi+\varphi l\}} - e^{j\varphi l}]$$

$$= \frac{1}{2\pi}\frac{-1}{\ln(1+\Delta)+(kn+m)}$$

$$[\{\cos(\ln\Delta 2\pi+\varphi l) - \cos\varphi l\} + j\{\sin(\ln\Delta 2\pi+\varphi l) - \sin\varphi l\}]$$

[Equation 12]

$$\frac{\omega 0}{\pi}\frac{1}{2j}\int_0^{\frac{2\pi}{\omega 0}} e^{j\{[\ln(1+\Delta)+(kn+m)]\omega 0 t+\varphi l\}} dt = \frac{\omega 0}{\pi}\frac{1}{2j}\frac{1}{-j\{\ln(1+\Delta)-(kn+m)\}\omega 0}$$

$$[e^{-j\{[\ln(1+\Delta)-(kn+m)]\omega 0 t+\varphi l\}}]_0^{\frac{2\pi}{\omega 0}}$$

$$= \frac{\omega 0}{\pi}\frac{1}{2j}\frac{1}{-j\{\ln(1+\Delta)-(kn+m)\}\omega 0}$$

$$[e^{-j\{[\ln(1+\Delta)-(kn+m)]2\pi+\varphi l\}} - e^{-j\varphi l}]$$

$$= \frac{\omega 0}{\pi}\frac{1}{2j}\frac{1}{-j\{\ln(1+\Delta)-(kn+m)\}\omega 0}$$

$$[e^{-j\{\ln\Delta 2\pi+\varphi l\}} - e^{-j\varphi l}]$$

$$= \frac{1}{2\pi}\frac{-1}{\ln(1+\Delta)-(kn+m)}$$

$$[\{\cos(\ln\Delta 2\pi+\varphi l) - \cos\varphi l\} - j\{\sin(\ln\Delta 2\pi+\varphi l) - \sin\varphi l\}]$$

When Equations 11 and 12 are substituted into Equation 10 and the equations are reorganized, the errors ΔS and ΔC will be as indicated by the following Equations 13 and 14.

[Equation 13]

$$\Delta S = \sum_{l=1}^{l} Vl \frac{1}{2\pi}\left\{\frac{-1}{\ln(1+\Delta)+(kn+m)} - \frac{1}{\ln(1+\Delta)-(kn+m)}\right\} \cdot$$

$$\{\cos(\ln\Delta 2\pi+\varphi l) - \cos\varphi l\}$$

$$= \sum_{l=1}^{l} Vl \frac{1}{2\pi}\frac{-2\ln(1+\Delta)}{\{\ln(1+\Delta)+(kn+m)\}\{\ln(1+\Delta)-(kn+m)\}} \cdot$$

$$(-2)\sin(\ln\Delta\pi+\varphi l)\sin(\ln\Delta\pi)$$

$$= \sum_{l=1}^{l}\frac{2(\ln)^2\Delta(1+\Delta)}{\{\ln(1+\Delta)+(kn+m)\}\{\ln(1+\Delta)-(kn+m)\}}$$

$$\frac{\sin(\ln\Delta\pi)}{\ln\Delta\pi} Vl \sin(\ln\Delta\pi+\varphi l)$$

$$= \sum_{l=1}^{l}\frac{2\Delta(1+\Delta)}{\left\{(1+\Delta)+\left(\frac{k+mln}{l}\right)\right\}\left\{(1+\Delta)-\left(\frac{k+mln}{l}\right)\right\}}$$

$$\frac{\sin(\ln\Delta\pi)}{\ln\Delta\pi} Vl \sin(\ln\Delta\pi+\varphi l)$$

$$= \sum_{l=1}^{l}\frac{2\Delta(1+\Delta)}{(1+\Delta)^2-\left(\frac{k+mln}{l}\right)^2}\frac{\sin(\ln\Delta\pi)}{\ln\Delta\pi} Vl\sin(\ln\Delta\pi+\varphi l)$$

[Equation 14]

$$\Delta C = \sum_{l=1}^{l} Vl\frac{1}{2\Pi}\left\{\frac{-1}{\ln(1+\Delta)+(kn+m)} + \frac{1}{\ln(1+\Delta)-(kn+m)}\right\} *$$

$$\{\sin(\ln\Delta 2\pi+\varphi l) - \sin\varphi l\}$$

$$= \sum_{l=1}^{l} Vl\frac{1}{2\Pi}2\frac{(kn+m)}{\{\ln(1+\Delta)+(kn+m)\}\{\ln(1+\Delta)-(kn+m)\}} -$$

$$2\cos(\ln\Delta\pi+\varphi l)\sin(\ln\Delta\pi)$$

$$= \sum_{l=1}^{l}\frac{2(\ln)\Delta(kn+m)}{\{\ln(1+\Delta)+(kn+m)\}\{\ln(1+\Delta)-(kn+m)\}}\frac{\sin(\ln\Delta\pi)}{\ln\Delta\pi} Vl\cos(\ln\Delta\pi+\varphi l)$$

$$= \sum_{l=1}^{l}\frac{2\Delta\left(\frac{k+m/n}{l}\right)}{\left\{(1+\Delta)+\left(\frac{k+m/n}{l}\right)\right\}\left\{(1+\Delta)-\left(\frac{k+m/n}{l}\right)\right\}}\frac{\sin(\ln\Delta\pi)}{\ln\Delta\pi} Vl\sin(\ln\Delta\pi+\varphi l)$$

$$= \sum_{l=1}^{l}\frac{2\Delta\left(\frac{k+m/n}{l}\right)}{(1+\Delta)^2-\left(\frac{k+m/n}{l}\right)^2}\frac{\sin(\ln\Delta\pi)}{\ln\Delta\pi} Vl\cos(\ln\Delta\pi+\varphi l)$$

Thus when the interharmonic of injected order (k.mth order) is extracted from the input signal Fin(t) of Equation 5 by the Fourier transform filter calculation, the cosine component Cm and sine component Sm will be the sum of the inherent cosine component (cos component) and sine component (sin component) and the error components ΔC and ΔS based on the system components (system fundamental and harmonics), as shown by the following Equations 15 and 16.

$$Cm = \frac{\omega 0}{\pi} \int_0^{\frac{2\pi}{\omega 0}} Fin(t)\sin(kn+m)\omega 0 t \, dt$$

$$= \cos\theta m + \sum_{l=1}^{l} \frac{2\Delta\left(\frac{k+m/n}{l}\right)}{(1+\Delta)^2 - \left(\frac{k+m/n}{l}\right)^2} \frac{\sin(\ln\Delta\pi)}{\ln\Delta\pi} Vl\cos(\ln\Delta\pi + \varphi l)$$

[Equation 15]

$$Sm = \frac{\omega 0}{\pi} \int_0^{\frac{2\pi}{\omega 0}} Fin(t)\cos(kn+m)\omega 0 t \, dt$$

$$= \sin\theta m + \sum_{l=1}^{l} \frac{2\Delta(1+\Delta)}{(1+\Delta)^2 - \left(\frac{k+m/n}{l}\right)^2} \frac{\sin(\ln\Delta\pi)}{\ln\Delta\pi} Vl\sin(\ln\Delta\pi + \varphi l)$$

[Equation 16]

A description shall now be given on specific values of the amplitudes of the error components ΔC and ΔS in Equations 15 and 16.

First, the amplitude GCm of error ΔC is determined by the following Equation 17 and the amplitude GSm of error ΔS is determined by the following Equation 18.

$$GCm = \frac{2\Delta\left(\frac{k+m/n}{1}\right)}{(1+\Delta)^2 - \left(\frac{k+m/n}{1}\right)^2} \frac{\sin(\ln\Delta\pi)}{\ln\Delta\pi}$$

[Equation 17]

$$GSm = \frac{2\Delta(1+\Delta)}{(1+\Delta)^2 - \left(\frac{k+m/n}{1}\right)^2} \frac{\sin(\ln\Delta\pi)}{\ln\Delta\pi}$$

[Equation 18]

Verification by simulation was performed by setting n=30, k=1, 2, 3, 4, frequency fluctuation Δ=−5%~+5%, l=1, 2, 3, 4, 5, 6, 7, and m=2, ..., 29. As shown in the following Table 1, when for example n=30, k=3, Δ=−5%, l=1, and m=1, it was found that GCm=−0.00776 and GSm=−0.00243.

TABLE 1

| l |    | m = 1 | 2 | 3 | 4 | 5 | 6 | 7 | 14 | 15 |
|---|----|-------|---|---|---|---|---|---|----|----|
| | | | | | k = 3 | | | | | |
| | | | | | Δ = −5.00% | | | | | |
| 1 | Cm | −0.00776 | −0.00785 | −0.00755 | −0.00748 | −0.00738 | −0.00727 | −0.00718 | −0.00662 | −0.00655 |
|   | Sm | −0.00243 | −0.00237 | −0.00232 | −0.00226 | −0.00221 | −0.00216 | −0.00211 | −0.00181 | −0.00178 |
| 2 | Cm | 0.00000 | 0.00000 | 0.00000 | 0.00000 | 0.00000 | 0.00000 | 0.00000 | 0.00000 | 0.00000 |
|   | Sm | 0.00000 | 0.00000 | 0.00000 | 0.00000 | 0.00000 | 0.00000 | 0.00000 | 0.00000 | 0.00000 |
| 3 | Cm | 0.05968 | 0.05076 | 0.04422 | 0.03922 | 0.03527 | 0.03207 | 0.02942 | 0.01889 | 0.01799 |
|   | Sm | 0.05607 | 0.04718 | 0.04066 | 0.03567 | 0.03174 | 0.02856 | 0.02593 | 0.01553 | 0.01465 |
| 4 | Cm | 0.00000 | 0.00000 | 0.00000 | 0.00000 | 0.00000 | 0.00000 | 0.00000 | 0.00000 | 0.00000 |
|   | Sm | 0.00000 | 0.00000 | 0.00000 | 0.00000 | 0.00000 | 0.00000 | 0.00000 | 0.00000 | 0.00000 |
| 5 | Cm | 0.00482 | 0.00495 | 0.00908 | 0.00522 | 0.00536 | 0.00551 | 0.00567 | 0.00698 | 0.00720 |
|   | Sm | 0.00754 | 0.00766 | 0.00778 | 0.00791 | 0.00804 | 0.00818 | 0.00832 | 0.00956 | 0.00977 |
| 6 | Cm | 0.00000 | 0.00000 | 0.00000 | 0.00000 | 0.00000 | 0.00000 | 0.00000 | 0.00000 | 0.00000 |
|   | Sm | 0.00000 | 0.00000 | 0.00000 | 0.00000 | 0.00000 | 0.00000 | 0.00000 | 0.00000 | 0.00000 |
| 7 | Cm | −0.00184 | −0.00187 | −0.00190 | −0.00193 | −0.00197 | −0.00200 | −0.00203 | −0.00228 | −0.00232 |
|   | Sm | −0.00403 | −0.00405 | −0.00408 | −0.00410 | −0.00413 | −0.00415 | −0.00418 | −0.00438 | −0.00441 |
| | | | | | k = 3 | | | | | |
| | | | | | Δ = −4.50% | | | | | |
| 1 | Cm | −0.00692 | −0.00583 | −0.00674 | −0.00665 | −0.00657 | −0.00649 | −0.00641 | −0.00590 | −0.00584 |
|   | Sm | −0.00218 | −0.00213 | −0.00208 | −0.00203 | −0.00198 | −0.00194 | −0.00189 | −0.00163 | −0.00159 |
| 2 | Cm | 0.00938 | 0.00915 | 0.00893 | 0.00872 | 0.00852 | 0.00833 | 0.00816 | 0.00711 | 0.00699 |
|   | Sm | 0.00591 | 0.00570 | 0.00550 | 0.00531 | 0.00514 | 0.00497 | 0.00482 | 0.00392 | 0.00381 |
| 3 | Cm | 0.01014 | 0.00851 | 0.00734 | 0.00646 | 0.00578 | 0.00523 | 0.00478 | 0.00302 | 0.00287 |
|   | Sm | 0.00958 | 0.00795 | 0.00678 | 0.00991 | 0.00523 | 0.00468 | 0.00423 | 0.00250 | 0.00235 |
| 4 | Cm | 0.01136 | 0.01193 | 0.01256 | 0.01324 | 0.01400 | 0.01484 | 0.01577 | 0.02717 | 0.03016 |
|   | Sm | 0.01430 | 0.01486 | 0.01547 | 0.01615 | 0.01589 | 0.01771 | 0.01863 | 0.02994 | 0.03291 |
| 5 | Cm | −0.00335 | −0.00344 | −0.00353 | −0.00362 | −0.00372 | −0.00382 | −0.00393 | −0.00482 | −0.00498 |
|   | Sm | −0.00527 | −0.00535 | −0.00543 | −0.00552 | −0.00561 | −0.00570 | −0.00580 | −0.00564 | −0.00679 |
| 6 | Cm | −0.00084 | −0.00086 | −0.00088 | −0.00089 | −0.00091 | −0.00093 | −0.00095 | −0.00109 | −0.00112 |
|   | Sm | −0.00159 | −0.00160 | −0.00161 | −0.00163 | −0.00165 | −0.00166 | −0.00168 | −0.00181 | −0.00183 |
| 7 | Cm | 0.00179 | 0.00182 | 0.00185 | 0.00188 | 0.00191 | 0.00195 | 0.00198 | 0.00222 | 0.00226 |
|   | Sm | 0.00395 | 0.00397 | 0.00399 | 0.00402 | 0.00404 | 0.00407 | 0.00409 | 0.00429 | 0.00432 |

TABLE 1-continued

| | | | | | m | | | | | |
|---|---|---|---|---|---|---|---|---|---|---|
| l | | 1 | 2 | 3 | 4 | 5 | 6 | 7 | 14 | 15 |
| | | | | | K = 3 | | | | | |
| | | | | | Δ = −4.00% | | | | | |
| 1 | Cm | −0.00457 | −0.00451 | −0.00445 | −0.00439 | −0.00434 | −0.00428 | −0.00423 | −0.00390 | −0.00385 |
| | Sm | −0.00145 | −0.00141 | −0.00138 | −0.00135 | −0.00131 | −0.00129 | −0.00126 | −0.00108 | −0.00106 |
| 2 | Cm | 0.01110 | 0.001082 | 0.01056 | 0.01031 | 0.01008 | 0.00985 | 0.00964 | 0.00840 | 0.00825 |
| | Sm | 0.00703 | 0.00678 | 0.00654 | 0.00632 | 0.00611 | 0.00591 | 0.00573 | 0.00465 | 0.00452 |
| 3 | Cm | −0.06752 | −0.05576 | −0.04756 | −0.04151 | −0.03687 | −0.03319 | −0.03021 | −0.01879 | −0.01786 |
| | Sm | −0.06410 | −0.05236 | −0.04418 | −0.03815 | −0.03353 | −0.02987 | −0.02691 | −0.01561 | −0.01469 |
| 4 | Cm | −0.00682 | −0.00716 | −0.00753 | −0.00793 | −0.00837 | −0.00886 | −0.00940 | −0.01585 | −0.01749 |
| | Sm | −0.00864 | −0.00897 | −0.00933 | −0.00972 | −0.01015 | −0.01063 | −0.01116 | −0.01756 | −0.01919 |
| 5 | Cm | 0.00000 | 0.00000 | 0.00000 | 0.00000 | 0.00000 | 0.00000 | 0.00000 | 0.00000 | 0.00000 |
| | Sm | 0.00000 | 0.00000 | 0.00000 | 0.00000 | 0.00000 | 0.00000 | 0.00000 | 0.00000 | 0.00000 |
| 6 | Cm | 0.00158 | 0.00181 | 0.00164 | 0.00167 | 0.00171 | 0.00174 | 0.00177 | 0.00204 | 0.00209 |
| | Sm | 0.00300 | 0.00302 | 0.00305 | 0.00308 | 0.00310 | 0.00313 | 0.00316 | 0.00340 | 0.00343 |
| 7 | Cm | −0.00170 | −0.00173 | −0.00176 | −0.00179 | −0.00182 | −0.00185 | −0.00188 | −0.00211 | −0.00215 |
| | Sm | −0.00377 | −0.00379 | −0.00382 | −0.00384 | −0.00386 | −0.00388 | −0.00391 | −0.00409 | −0.00412 |

According to the above-mentioned simulation, the frequency for example of an interharmonic of the 3.15th order with k=3 and m=15 in a 60 Hz system is 60 Hz×3+2 Hz×15=180+30=210 Hz and if the system frequency fluctuation Δ is −2.5%, the amplitudes of the errors (residual errors) due to the fundamental (l=1) will be GCm=0.00465 (=0.465%) and GSm=0.00129 (=0.129%), while when the frequency fluctuation Δ is −5%, the amplitudes of the errors ΔC and ΔS based on the fundamental will be GCm=−0.00655 (=−0.655%) and GSm=−0.00178 (=−0.178%).

Meanwhile, if the fundamental is set to 100%, the injection amount of the interharmonic will be approximately 0.1%.

The above-mentioned amplitudes (gains) GCm and GSm of the respective errors ΔC and ΔS are thus contained in the extracted cos component and sin component at a magnitude of the same order (percentage) as the injection amount of the interharmonic, and if the errors ΔC and ΔS are large, the components cos θm and sin θm of the inherent interharmonics cannot be separated and detected precisely with the extracted cosine components Cm and sine components Sm of Equations 15 and 16 being as they are.

The amplitudes GCm and GSm of the errors ΔC and ΔS due to the system components in Equations 15 and 16 vary according to k and m as shown in Equations 19 and 20 below and for values of m that are close to each other, the amplitudes vary practically linearly with m.

$$\Delta C = \frac{2\Delta\left(\frac{k+\min}{l}\right)}{(l+\Delta)^2 - \left(\frac{k+\min}{l}\right)^2} \frac{\sin(\ln\Delta\pi)}{\ln\Delta\pi} Vl\cos(\ln\Delta\pi + \varphi l) \quad \text{[Equation 19]}$$

$$\Delta S = \frac{2\Delta(l+\min)}{(l+\Delta)^2 - \left(\frac{k+\min}{l}\right)^2} \frac{\sin(\ln\Delta\pi)}{\ln\Delta\pi} Vl\sin(\ln\Delta\pi + \varphi l) \quad \text{[Equation 20]}$$

To be more specific, under the conditions of k=3 and Δ=−5%, the amplitudes $GC_5$, $GC_6$, $GC_7$, $GS_5$, $GS_6$, and $GS_7$, for m=5, 6, 7 when l=1, 3 will be as follow according to Table 1.

l=1: $GC_5$=−0.00736, $GC_6$=−0.00727, $GC_7$=−0.00718
$GS_5$=−0.00221, $GS_6$=−0.00216, $GS_7$=−0.00211 l=3: $GC_5$=0.03527, $GC_6$=0.03207, $GC_7$=0.02942 $GS_5$= 0.03174, $GS_6$=0.02856, $GS_7$=0.02593

As shown in the following Equations 21 to 24, the, amplitudes $GC_6$ and $GS_6$ can be determined by interpolation from the average values of the gains $GC_5$, $GC_7$, $GS_5$, and $GS_7$ of the lower and upper interharmonic error components ΔC and ΔS.

$$l=1: (GC_5+GC_7)/2=-0.00727=GC_6 \quad \text{[Equation 21]}$$

$$l=1: (GS_5+GS_7)/2=-0.00216=GS_6 \quad \text{[Equation 22]}$$

$$l=3: (GC_5+GC_7)/2=0.032345 \approx GC_6 \quad \text{[Equation 23]}$$

$$l=3: (GS_5+GS_7)/2=0.028835 \approx GS_6 \quad \text{[Equation 24]}$$

Figure 7:
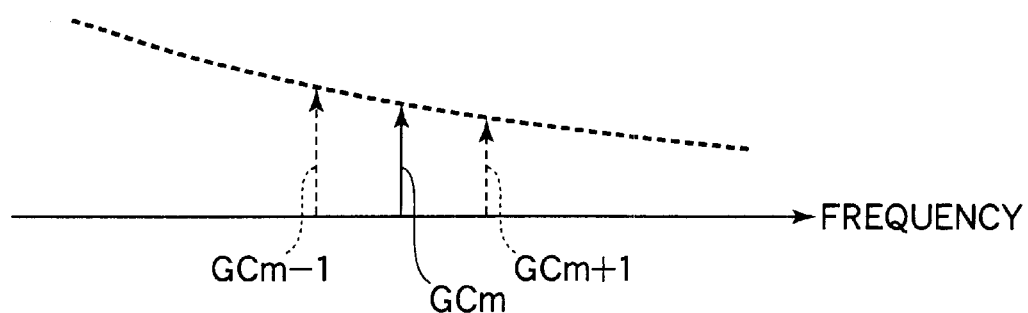
FIG. 7 is a waveform diagram for explaining an example of the interpolation by the computing processor of FIG. 6.
Figure 8:
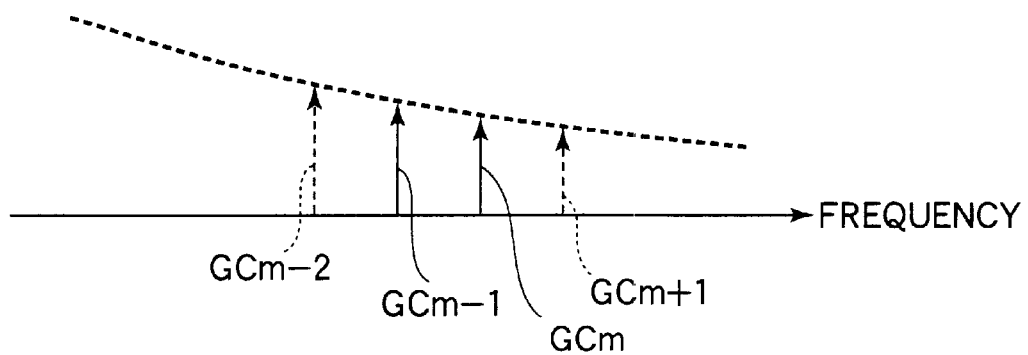
FIG. 8 is a waveform diagram for explaining another example of the interpolation by the computing processor of FIG. 6.

That is, among the interharmonics of the three adjacent channels of the k.m−1th order, k.mth order, and k.m+1th order of m−1, m, and m+1, the amplitudes ($GCm_{-1}$, $GSm_{-1}$), ($GCm$, $GSm$), and ($GCm_{+1}$, $GSm_{+1}$) of the errors (ΔC, ΔS) of the system components vary practically linearly with frequency as shown by the broken line of FIG. 7, and the gains GCm and GSm of the system component errors ΔC and ΔS for the intermediates k.mth-order can be determined as gains GCm' and GSm' by the interpolations by the following Equations 25 and 26 that determine the average values of the gains $GCm_{-1}$ and $GCm_{+1}$, and $GSm_{-1}$ and $GSm_{+1}$ of the system component errors ΔC and ΔS of the upper and lower k.m−1th and k.m+1th orders. Though FIG. 7 shows the amplitudes $GCm_{-1}$, GCm, and $GCm_{+1}$ the same applies to $GSm_{-1}$, GSm, and $GSm_{+1}$, as well.

$$GCm'=(GC_{m-1}+GC_{m+1})/2 \quad \text{[Equation 25]}$$

$$GSm'=(GS_{m-1}+GS_{m+1})/2 \quad \text{[Equation 26]}$$

Simulation calculations of the amplitudes GCm" and GSm" of the differences between the amplitudes GCm and GSm of the errors ΔC and ΔS contained in the extracted components Cm and Sm and the amplitudes GCm' and GSm', determined from interpolations using Equations 25 and 26, were performed using the following Equations 27 and 28. The results shown in the following Table 2 were obtained.

$$GCm"=GCm-(GC_{m-1}+GC_{m+1})/2 \quad \text{[Equation 27]}$$

$GSm''=GSm-(GS_{m-1}+GS_{m+1})/2$ [Equation 28]

TABLE 2

| | | | | | m | | | | |
|---|---|---|---|---|---|---|---|---|---|
| l | | 2 | 3 | 4 | 5 | 6 | 7 | 14 | 15 | k = 3
Δ = −5.00%

| | | | | | | | | | |
|---|---|---|---|---|---|---|---|---|---|
| 1 | Cm' | 0.00000 | 0.00000 | 0.00000 | 0.00000 | 0.00000 | 0.00000 | 0.00000 | 0.00000 |
| | Sm' | 0.00000 | 0.00000 | 0.00000 | 0.00000 | 0.00000 | 0.00000 | 0.00000 | 0.00000 |
| 2 | Cm' | 0.00000 | 0.00000 | 0.00000 | 0.00000 | 0.00000 | 0.00000 | 0.00000 | 0.00000 |
| | Sm' | 0.00000 | 0.00000 | 0.00000 | 0.00000 | 0.00000 | 0.00000 | 0.00000 | 0.00000 |
| 3 | Cm' | −0.00119 | −0.00077 | −0.00053 | −0.00038 | −0.00028 | −0.00021 | −0.00005 | −0.00004 |
| | Sm' | −0.00119 | −0.00077 | −0.00053 | −0.00038 | −0.00028 | −0.00021 | −0.00005 | −0.00004 |
| 4 | Cm' | 0.00000 | 0.00000 | 0.00000 | 0.00000 | 0.00000 | 0.00000 | 0.00000 | 0.00000 |
| | Sm' | 0.00000 | 0.00000 | 0.00000 | 0.00000 | 0.00000 | 0.00000 | 0.00000 | 0.00000 |
| 5 | Cm' | 0.00000 | 0.00000 | 0.00000 | 0.00000 | 0.00000 | 0.00000 | −0.00001 | −0.00001 |
| | Sm' | 0.00000 | 0.00000 | 0.00000 | 0.00000 | 0.00000 | 0.00000 | −0.00001 | −0.00001 |
| 6 | Cm' | 0.00000 | 0.00000 | 0.00000 | 0.00000 | 0.00000 | 0.00000 | 0.00000 | 0.00000 |
| | Sm' | 0.00000 | 0.00000 | 0.00000 | 0.00000 | 0.00000 | 0.00000 | 0.00000 | 0.00000 |
| 7 | Cm' | 0.00000 | 0.00000 | 0.00000 | 0.00000 | 0.00000 | 0.00000 | 0.00000 | 0.00000 |
| | Sm' | 0.00000 | 0.00000 | 0.00000 | 0.00000 | 0.00000 | 0.00000 | 0.00000 | 0.00000 | k = 3
Δ = −4.50%

| | | | | | | | | | |
|---|---|---|---|---|---|---|---|---|---|
| 1 | Cm' | 0.00000 | 0.00000 | 0.00000 | 0.00000 | 0.00000 | 0.00000 | 0.00000 | 0.00000 |
| | Sm' | 0.00000 | 0.00000 | 0.00000 | 0.00000 | 0.00000 | 0.00000 | 0.00000 | 0.00000 |
| 2 | Cm' | −0.00001 | −0.00001 | −0.00001 | 0.00000 | 0.00000 | 0.00000 | 0.00000 | 0.00000 |
| | Sm' | −0.00001 | −0.00001 | −0.00001 | 0.00000 | 0.00000 | 0.00000 | 0.00000 | 0.00000 |
| 3 | Cm' | −0.00023 | −0.00015 | −0.00010 | −0.00007 | −0.00005 | −0.00004 | −0.00001 | −0.00001 |
| | Sm' | −0.00023 | −0.00015 | −0.00010 | −0.00007 | −0.00005 | −0.00004 | −0.00001 | −0.00001 |
| 4 | Cm' | −0.00003 | −0.00003 | −0.00003 | −0.00004 | −0.00005 | −0.00006 | −0.00026 | −0.00035 |
| | Sm' | −0.00003 | −0.00003 | −0.00003 | −0.00004 | −0.00005 | −0.00006 | −0.00026 | −0.00035 |
| 5 | Cm' | 0.00000 | 0.00000 | 0.00000 | 0.00000 | 0.00000 | 0.00000 | 0.00000 | 0.00000 |
| | Sm' | 0.00000 | 0.00000 | 0.00000 | 0.00000 | 0.00000 | 0.00000 | 0.00000 | 0.00000 |
| 6 | Cm' | 0.00000 | 0.00000 | 0.00000 | 0.00000 | 0.00000 | 0.00000 | 0.00000 | 0.00000 |
| | Sm' | 0.00000 | 0.00000 | 0.00000 | 0.00000 | 0.00000 | 0.00000 | 0.00000 | 0.00000 |
| 7 | Cm' | 0.00000 | 0.00000 | 0.00000 | 0.00000 | 0.00000 | 0.00000 | 0.00000 | 0.00000 |
| | Sm' | 0.00000 | 0.00000 | 0.00000 | 0.00000 | 0.00000 | 0.00000 | 0.00000 | 0.00000 |

K = 3
Δ = −4.00%

| | | | | | | | | | |
|---|---|---|---|---|---|---|---|---|---|
| 1 | Cm' | 0.00000 | 0.00000 | 0.00000 | 0.00000 | 0.00000 | 0.00000 | 0.00000 | 0.00000 |
| | Sm' | 0.00000 | 0.00000 | 0.00000 | 0.00000 | 0.00000 | 0.00000 | 0.00000 | 0.00000 |
| 2 | Cm' | −0.00001 | −0.00001 | −0.00001 | −0.00001 | −0.00001 | −0.00001 | 0.00000 | 0.00000 |
| | Sm' | −0.00001 | −0.00001 | −0.00001 | −0.00001 | −0.00001 | 0.00000 | 0.00000 | 0.00000 |
| 3 | Cm' | 0.00178 | 0.00108 | 0.00070 | 0.00048 | 0.00035 | 0.00026 | 0.00006 | 0.00005 |
| | Sm' | 0.00178 | 0.00108 | 0.00070 | 0.00048 | 0.00035 | 0.00026 | 0.00006 | 0.00005 |
| 4 | Cm' | 0.00001 | 0.00002 | 0.00002 | 0.00002 | 0.00003 | 0.00003 | 0.00013 | 0.00018 |
| | Sm' | 0.00002 | 0.00002 | 0.00002 | 0.00002 | 0.00003 | 0.00003 | 0.00013 | 0.00018 |
| 5 | Cm' | 0.00000 | 0.00000 | 0.00000 | 0.00000 | 0.00000 | 0.00000 | 0.00000 | 0.00000 |
| | Sm' | 0.00000 | 0.00000 | 0.00000 | 0.00000 | 0.00000 | 0.00000 | 0.00000 | 0.00000 |
| 6 | Cm' | 0.00000 | 0.00000 | 0.00000 | 0.00000 | 0.00000 | 0.00000 | 0.00000 | 0.00000 |
| | Sm' | 0.00000 | 0.00000 | 0.00000 | 0.00000 | 0.00000 | 0.00000 | 0.00000 | 0.00000 |
| 7 | Cm' | 0.00000 | 0.00000 | 0.00000 | 0.00000 | 0.00000 | 0.00000 | 0.00000 | 0.00000 |
| | Sm' | 0.00000 | 0.00000 | 0.00000 | 0.00000 | 0.00000 | 0.00000 | 0.00000 | 0.00000 |

The Cm' and Sm' in Table 2 are the amplitudes GCm" and GSm", and as is clear from this Table 2, the amplitudes GCm" and GSm" become practically 0, confirming that the amplitudes GCm and GSm are determined extremely precisely by the above-described interpolation.

In the case where only a current of the k.mth-order interharmonic is injected and the upper and lower interharmonics of k.m−1th order and k.m+1th order are not injected, the computing processor 225 extracts the components $Cm_{-1}$, $Cm_{+1}$, $Sm_{-1}$, and $Sm_{+1}$ of the k.m−1th order and the k.m+1th order by the Fourier transform filter calculation, the error components ΔCm and ΔSm of the k.mth order are interpolated as the average value of the components $Cm_{-1}$ and $Cm_{+1}$ and the average value of components $Sm_{-1}$ and $Sm_{+1}$, and these average values are subtracted from the components Cm and Sm of the k.mth order that are extracted at the same time to eliminate the error components ΔC and ΔS of Equations 15 and 16 that are contained in the components Cm and Sm to correct the components Cm and Sm and thereby extract and detect the inherent cosine component (cos θm) and sine component (sin θm) of the interharmonic with precision.

In this case, sampling of the measurement signals by an inexpensive and simple fixed frequency sampling system can be implemented without the use of a complex PLL circuit.

Also, by applying to the extracted components of the interharmonic of injected order (k.mth order), which have been obtained by Fourier transform of the sampling data, a simple interpolation based on the extracted components of the upper and lower non-injected orders of k.m−1 and k.m+1, the voltage and current of the interharmonic of the injected order can be extracted and detected precisely while hardly being affected by the system components.

The injected frequency finj of the interharmonic may be determined from finj=kf−mfo.

Also in the case where interharmonics of a plurality of injected orders are to be injected and isolated operation is to be detected based on the principle of majority from the detection results to prevent erroneous detection of isolated operation, etc., the injected frequency (injected order) of each interharmonic is preferably determined in accordance with Equation 1 and set at intervals of $f_o$ between the kth harmonic and the k+1th harmonic.

In this case interharmonics may actually be injected based on the determined injection frequencies, that is, interharmonics of every other injection frequency, for example, of m=1, 3, 5, 7, . . . or m=2, 4, 6, . . . may be injected so that interharmonics of non-injected orders will exist at the adjacent upper and lower open channels, and correction of the system components may be applied individually to each interharmonic of injected order as in the embodiment described above. However, the correction may be applied in one batch in the following manner.

That is for example, interharmonics of a plurality of continuous orders such that m=m−1, m may be determined in accordance with Equation 1 and injected into power system 205, and since the amplitudes $GCm_{-2}$ and $GCm_{+1}$ ($GSm_{-2}$ and $GSm_{+1}$) of the interharmonics of the upper and lower orders for which m=m−2 and m+1 will vary substantially linearly in the same manner as the gains $GCm_{-1}$ and $GCm$ ($GSm_{-1}$ and $GSm$) in this case, the amplitudes $GCm_{-1}$ and $GCm$ ($GSm_{-1}$ and $GSm$) may be interpolated from the so-called weighted averages of the amplitudes $GCm_{-2}$ and $GCm_{+1}$ ($GSm_{-2}$ and $GSm_{+1}$).

To be more specific, the amplitudes $GCm$, $GSm$, $GCm_{+1}$ and $GSm_{+1}$ are interpolated from weighted averages of the following Equations 31 to 32 to determine the error components $\Delta Cm_{-1}$, $\Delta Sm_{-1}$, $\Delta Cm$ and $\Delta Sm$ of the k.m−1th order and k.mth order and correct the components ($Cm_{-1}$, $Sm_{-1}$, $Cm$ and $Sm$) in one batch.

$(2GC_{m+1}+GC_{m-2})/3$ [Equation 29]

$(2GS_{m+1}+GS_{m-2})/3$ [Equation 30]

$(GC_{m+1}+2GC_{m-2})/3$ [Equation 31]

$(GS_{m+1}+2GS_{m-2})/3$ [Equation 32]

In setting the frequency of the interharmonic, it is preferable to set, as much as possible, a frequency that is intermediate the kth-order and k+1th-order harmonics so as to minimize the influence of these harmonics. To be more specific, in the case where k=2 and f=60 Hz, the injected frequency of the interharmonic is preferably set at a frequency close to 150 Hz, which lies in the middle between 120 Hz (=2×60 Hz) and 180 Hz (=3×60 Hz).

Needless to say, this invention may be applied not only to the interharmonic detection in the detection of isolated operation of a distributed power supply but may also be applied for example to the interharmonic detection in the detection of characteristics of a power system using interharmonics.

According to the first embodiment, the invention provides the following effects.

Flicker fluctuation of power at receiving point 9, which is based on the fluctuation of the power generated by a distributed power supply 7, comprised of a wind power generator, etc., is detected by a power fluctuation monitoring means, a compensation power injection signal for canceling out the power fluctuation is formed, on the basis of the detection, by a power compensation means, and the driving of an inverter device 18 is controlled by the signal obtained by adding the intermediate-order harmonic current injection signal and the compensation power injection signal so that the inverter device 18 may be used for both injection of the intermediate-order harmonic current and injection of the compensation power for canceling out the flicker fluctuation of the power.

Inverter device 18, etc. can thus be used to add a power fluctuation compensation function to the isolated operation prevention device of distributed power supply 7, and this type of receiving equipment can be formed by eliminating the conventional power fluctuation compensation device that is separate from the isolated operation prevention device so as to enable prevention of isolated operation of distributed power supply 7 and power fluctuation compensation (flicker fluctuation compensation) in the same manner as in the conventional art while making the equipment scale small and lessening the equipment investments by the customer. Significant effects are thus provided especially in the case where a wind power generator, which is large in capacity and fluctuates in generated power, is used as distributed power supply 7.

According to the second embodiment, the invention provides the following effects.

The power of interconnected operation and the interharmonic are supplied serially into the system (distribution line 105) from power converter 118, and the system interruption that accompanies the stoppage of the system supply is detected from a change of the system's electric quantity for the interharmonic to prevent isolated operation without fail.

Since variation of the reactive power or active power is not applied to the system as in the detection of isolated operation by the conventional active detection systems ($\Delta Q$ system, $\Delta P$ system), flicker, beating, and other ill effects do not occur in the system and the system quality will not be lowered.

Moreover, since the interharmonic is of a higher frequency than the system fundamental and a change of electric quantity thereof will thus appear rapidly in the measurement results, disconnection can be performed rapidly based upon detection of system interruption and adequate accommodations can be made even when the reclosing time of an upper level system is short.

Next, the power converter 118 is driven by a drive command signal formed by adding the supply signal for the power of interconnected operation and the injection control signal for age an interharmonic, which is for detection of isolated operation and has a frequency that is a non-integer multiple of the system fundamental. An alternating output resulting from the synthesis of the interconnected operation power and interharmonic, is generated by means of power converter 118, and the interconnected operation power and the interharmonic can be supplied serially into the system based on the alternating output.

Furthermore, the system interruption that accompanies stoppage of the system supply can be detected from a change of the system's electric quantity for the interharmonic based on at least one of either the current or voltage of the interharmonic. And power converter 118 can be cut off from the system and disconnected from the system based on this detection of system interruption to thereby realize prevention of isolated operation in the same manner as in the first embodiment.

Further, since the frequency of the interharmonic of each distributed power supply 111 connected to the system is differed according to each power supply 111, there is no mutual interference of interharmonics among the power supplies 111 and the isolated operation of each distributed power supply 111 can be prevented without fail by means of each distributed power supply 111 and without having to provide a means for synchronization among the respective distributed power supplies 111.

Furthermore, since the interharmonic for isolated operation detection is supplied into the system via the power converter and along with the interconnected operation power, a distributed power supply, which in itself is enabled to detect isolated operation by means of an interharmonic, can be provided.

According to the third embodiment, the invention provides the following effects.

The interharmonic that is injected into a power system 205 can be sampled inexpensively and readily by a fixed frequency sampling system of a constant sampling frequency without the use of a PLL circuit, etc.

Furthermore, the errors, based on the fundamental and harmonics of the system, of the interharmonic extracted by Fourier transform of the sampling data can be eliminated by means of simple interpolation for average values and subtraction to correct the errors that arise from the non-synchronization of the system frequency and sampling frequency and detect the interharmonic at high precision.

Interharmonic detection of high precision can thus be performed using a fixed frequency sampling system and an interharmonic detection method that is favorable for isolated operation detection of a distributed power supply, etc. can be provided.

Additionally, the same effects may be obtained by determining the frequencies of the interharmonics to be injected by calculation using a simple equation, which is extremely practical.

What is claimed is:

1. An isolated operation prevention device for a distributed power supply connected to a power system, which injects an intermediate-order harmonic current with a frequency being a non-integer multiple of a system fundamental from a injection point into an incoming line of a customer equipment having said distributed power supply, and detects an interruption of said system on the basis of a voltage at said injection point of said intermediate-order harmonic current and an injection amount of said intermediate-order harmonic current at a receiving point, to cause said distributed power supply to be disconnected from said system, the device comprising:

a power fluctuation monitoring unit which monitors and detects a power fluctuation due to a flicker fluctuation at said receiving point on the basis of the voltage at said injection point and the current in said incoming line;

a power compensation unit which forms a compensation power injection signal for canceling out said power fluctuation based on the detected power fluctuation; and an inverter device which is driven and controlled by a signal obtained by adding said compensation power injection signal to an injection signal of said intermediate-order harmonic current and injects said intermediate-order harmonic current and a compensation power into said injection point.

2. A distributed power supply comprising:

a supplying unit which adds a supply signal for power during interconnected operation and an injection control signal for an interharmonic and supplies the additional result as a drive command signal to a power converter connected to a power system;

a detecting unit which detects a stoppage of a system supply based on a change of an electric quantity for said interharmonic; and a controller which prevents an isolated operation by corresponding to said detected stoppage of said system supply.

3. A distributed power supply which is formed by connecting a power converter to a power system, comprising:

a supplying unit which adds a first signal for supplying an interconnected operation power and a second signal for an interharmonic to detect an isolated operation, a frequency of said interharmonic being a non-integer multiple of a system fundamental, supplies both signals to said power converter so that said power converter supplies said interconnection operation power and said interharmonic serially into said system;

a detecting unit which detects a stoppage of a system supply from a change of an electric quantity of said system for said interharmonic based on at least one of a voltage of said interharmonic or a current of said interharmonic; and a controller which cuts off said power converter from said system based on said detected stoppage of said system supply.

4. A power equipment, in which a plurality of the distributed power supplies according to claim 2 or 3 are connected, wherein a frequency of said interharmonic is differed according to each of the plurality of distributed power supplies.

5. A distributed power supply which supplies power during interconnected operation to a power system via a power converter, comprising a supplying unit which supplies the added result of an interharmonic and said power as a drive command signal to said system via said power converter to detect an isolated operation of the distributed power supply.

6. A method for detecting interharmonic for a power system comprising a step of;

sampling at least one of a voltage or a current of a power system by a fixed frequency sampling system with the sampling frequency being constant;

extracting components of an interharmonic of an injected order and interharmonics of non-injected orders above and below said injected order by a filter calculation using a Fourier transform of sampling data;

interpolating a system fundamental contained in said extracted components of said interharmonic of the injected order and errors based on system components of harmonics of integer multiple frequencies in corresponding to averages of said extracted components of said interharmonics of the non-injected orders; and eliminating said errors by subtracting from said extracted components of said interharmonic of the injected order; and detecting said interharmonic of the injected order.

7. The method according to claim 6, wherein said interharmonic of the injected order is an interharmonic between a kth harmonic and a k+th harmonic (where k is an integer greater than or equal to 2) and an injected frequency of said interharmonic is determined from $kf \pm mf_o$ where f is a frequency of said system fundamental, m is an integer of value $1, 2, \ldots, n-1$, n is an integer greater than or equal to 2, f is an injection interval of said interharmonic, and $f_o = f/n$).

8. A distributed power supply in accordance with claims 2 or 5, comprising a power compensation unit which forms a compensation signal for canceling detected power fluctuations.

* * * * *